(12) United States Patent
Ijaz et al.

(10) Patent No.: US 8,257,855 B2
(45) Date of Patent: Sep. 4, 2012

(54) PRISMATIC BATTERY MODULE WITH SCALABLE ARCHITECTURE

(75) Inventors: Mujeeb Ijaz, Leonard, MI (US);
Jonathan E. Hostler, Canton, MI (US);
Shazad M. Butt, Troy, MI (US)

(73) Assignee: A123 Systems, Inc., Waltham, MA (US)

( * ) Notice: Subject to any disclaimer, the term of this patent is extended or adjusted under 35 U.S.C. 154(b) by 275 days.

(21) Appl. No.: 12/628,809

(22) Filed: Dec. 1, 2009

(65) Prior Publication Data

US 2010/0247999 A1    Sep. 30, 2010

Related U.S. Application Data

(60) Provisional application No. 61/143,976, filed on Jan. 12, 2009.

(51) Int. Cl.
*H01M 10/50* (2006.01)
(52) U.S. Cl. ................................... 429/120
(58) Field of Classification Search .......... 429/120
See application file for complete search history.

(56) References Cited

U.S. PATENT DOCUMENTS

| | | |
|---|---|---|
| 3,314,824 A | 4/1967 | Spanur |
| 3,634,810 A | 1/1972 | Pemberton |
| 4,567,119 A | 1/1986 | Lim |
| 5,071,652 A | 12/1991 | Jones et al. |
| 5,158,842 A | 10/1992 | McHenry |
| 5,162,164 A | 11/1992 | Dougherty et al. |
| 5,162,171 A | 11/1992 | Jones |
| 5,168,017 A | 12/1992 | Jones et al. |
| 5,254,415 A | 10/1993 | Williams et al. |
| 5,310,609 A | 5/1994 | Earl et al. |
| 5,338,624 A | 8/1994 | Gruenstern et al. |
| 5,354,630 A | 10/1994 | Earl et al. |

(Continued)

FOREIGN PATENT DOCUMENTS

EP    0967700 A1    12/1999

(Continued)

OTHER PUBLICATIONS

International Search Report and Written Opinion for International Application No. PCT/US10/020636 mailed Mar. 8, 2010. 12 pages.

(Continued)

*Primary Examiner* — Roy King
*Assistant Examiner* — Carlos Barcena
(74) *Attorney, Agent, or Firm* — Wilmer Cutler Pickering Hale and Dorr LLP

(57) ABSTRACT

A battery system including: a plurality of subunits each of which has a heatsink and a battery cell and two voltage terminals symmetrically positioned with respect to a centerline of that battery cell, wherein all of the battery cells are arranged so that their voltage terminals are aligned along two rows; a plurality of identical busbar supports equal in number to the plurality of subunits, each having two slots and mounted on a corresponding different one of the subunits with each of the terminals of the battery cell extending up through the two slots; and a plurality of bimetallic busbars, each one supported by a different corresponding subset of the busbar supports and electrically connected directly to either a first or second terminal of each of the battery cells of each of the modules on which those busbar supports are mounted.

14 Claims, 20 Drawing Sheets

U.S. PATENT DOCUMENTS

| | | | |
|---|---|---|---|
| 5,397,661 | A | 3/1995 | Kaun |
| 5,401,595 | A | 3/1995 | Kagawa et al. |
| 5,643,693 | A | 7/1997 | Hill et al. |
| 5,756,227 | A | 5/1998 | Suzuki et al. |
| 5,963,123 | A | 10/1999 | Douglass |
| 6,099,986 | A | 8/2000 | Gauthier et al. |
| 6,117,584 | A | 9/2000 | Hoffman et al. |
| 6,390,858 | B2 | 5/2002 | Saito et al. |
| 6,396,026 | B2 | 5/2002 | Gillner et al. |
| 6,529,559 | B2 | 3/2003 | Reshef |
| 6,548,206 | B1 | 4/2003 | Gauthier et al. |
| 6,821,671 | B2 * | 11/2004 | Hinton et al. ............... 429/120 |
| 7,118,827 | B2 | 10/2006 | Kruger et al. |
| 7,270,912 | B2 | 9/2007 | Oogami |
| 7,531,270 | B2 | 5/2009 | Buck et al. |
| 2002/0022178 | A1 | 2/2002 | Asaka et al. |
| 2003/0017384 | A1 * | 1/2003 | Marukawa et al. ........... 429/120 |
| 2003/0091896 | A1 | 5/2003 | Watanabe et al. |
| 2003/0143458 | A1 | 7/2003 | Asahina et al. |
| 2004/0021442 | A1 | 2/2004 | Higashino |
| 2004/0028995 | A1 | 2/2004 | Shelekhin et al. |
| 2005/0146825 | A1 | 7/2005 | Kaszeta et al. |
| 2005/0221177 | A1 | 10/2005 | Amagai et al. |
| 2006/0051665 | A1 | 3/2006 | Rigobert et al. |
| 2006/0194101 | A1 | 8/2006 | Ha et al. |
| 2006/0234119 | A1 | 10/2006 | Kruger et al. |
| 2006/0292437 | A1 | 12/2006 | Matsumoto et al. |
| 2007/0141459 | A1 | 6/2007 | Goto et al. |
| 2007/0207377 | A1 | 9/2007 | Han et al. |
| 2008/0090137 | A1 | 4/2008 | Buck et al. |
| 2008/0124617 | A1 | 5/2008 | Bjork |
| 2009/0053591 | A1 | 2/2009 | Ikeda et al. |
| 2009/0142653 | A1 | 6/2009 | Okada et al. |
| 2009/0214941 | A1 | 8/2009 | Buck et al. |

FOREIGN PATENT DOCUMENTS

| | | | |
|---|---|---|---|
| JP | 2000077056 A | | 3/2000 |
| JP | 2002151045 A | * | 5/2002 |
| JP | 2003168410 A | | 6/2003 |
| WO | WO-2007132991 A1 | | 11/2007 |
| WO | WO-2008098193 A2 | | 8/2008 |

OTHER PUBLICATIONS

International Search Report and Written Opinion for International Application No. PCT/US10/020638 mailed Mar. 31, 2010. 7 pages.
International Search Report and Written Opinion for International Application No. PCT/US10/20633 mailed Mar. 17, 2010. 9 pages.
International Search Report and Written Opinion for International Application No. PCT/US10/20639 mailed Mar. 30, 2010. 6 pages.

* cited by examiner

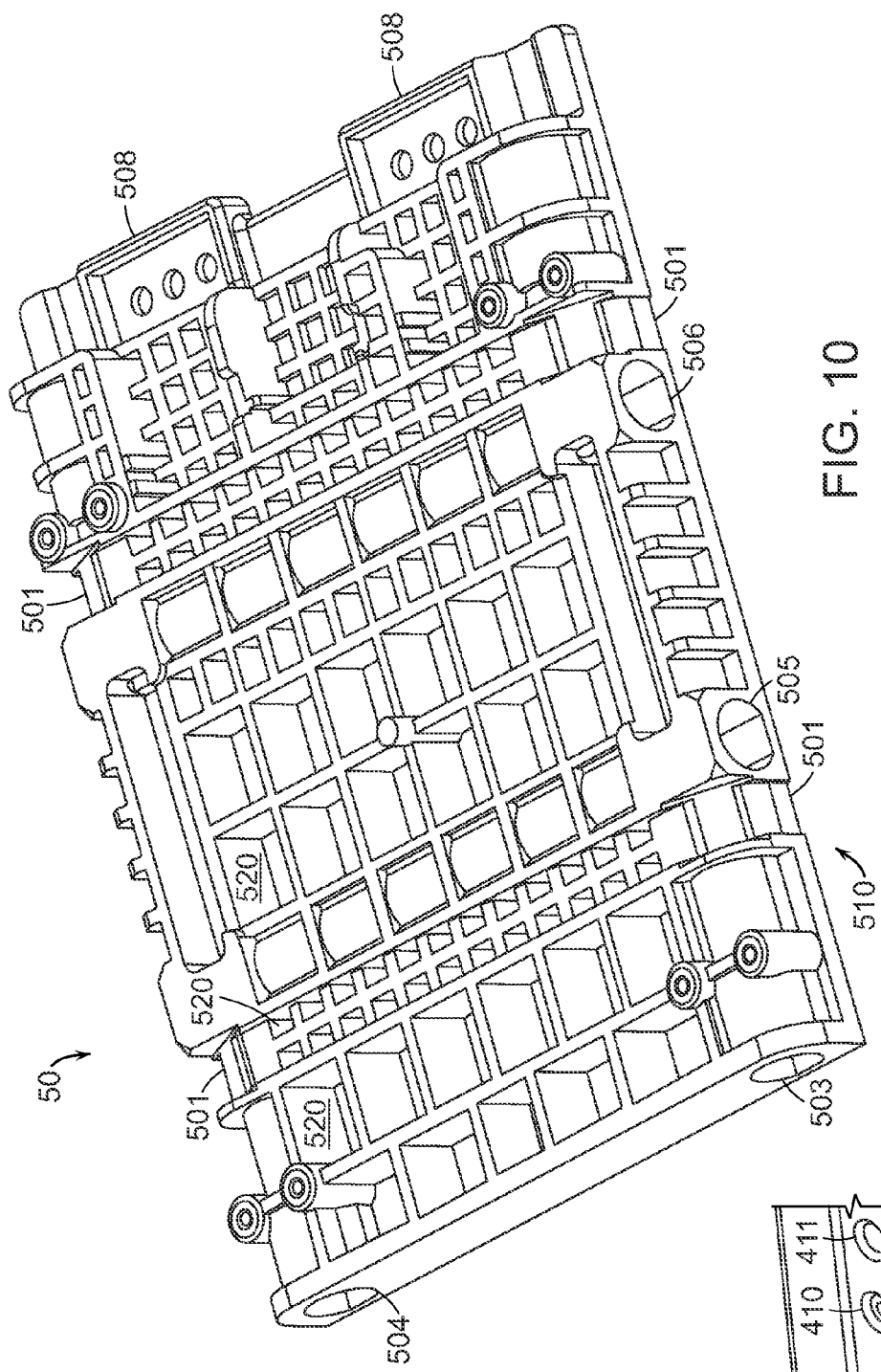
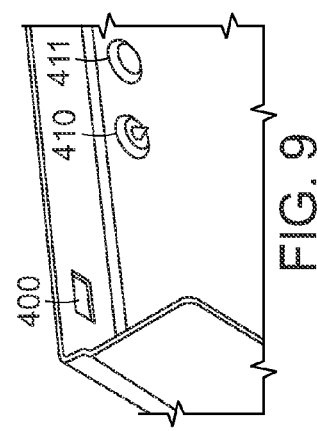

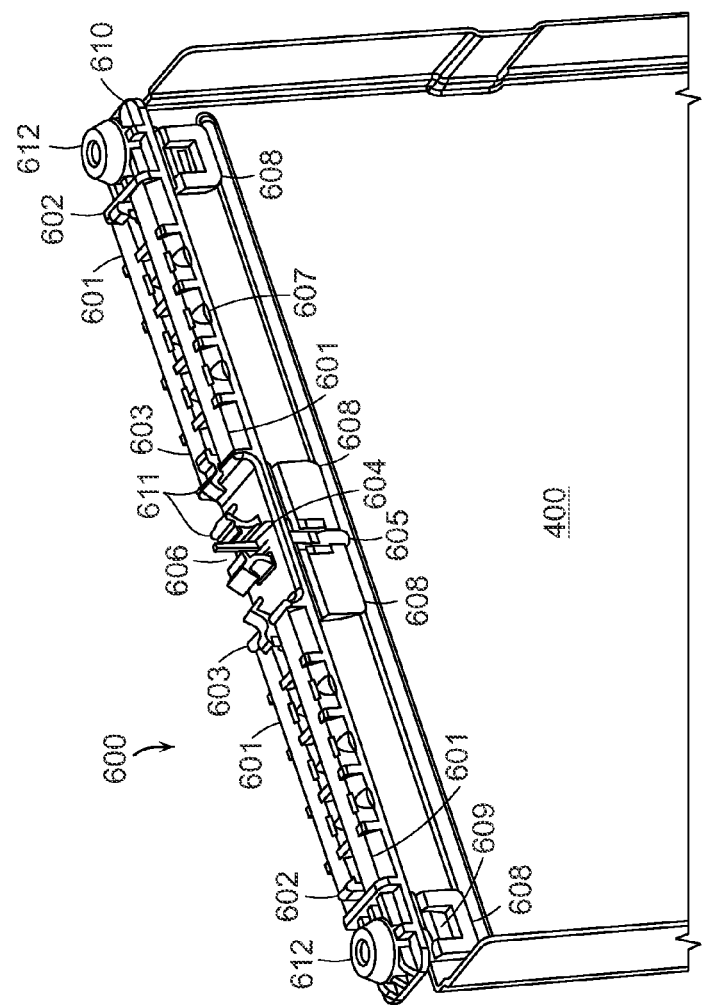
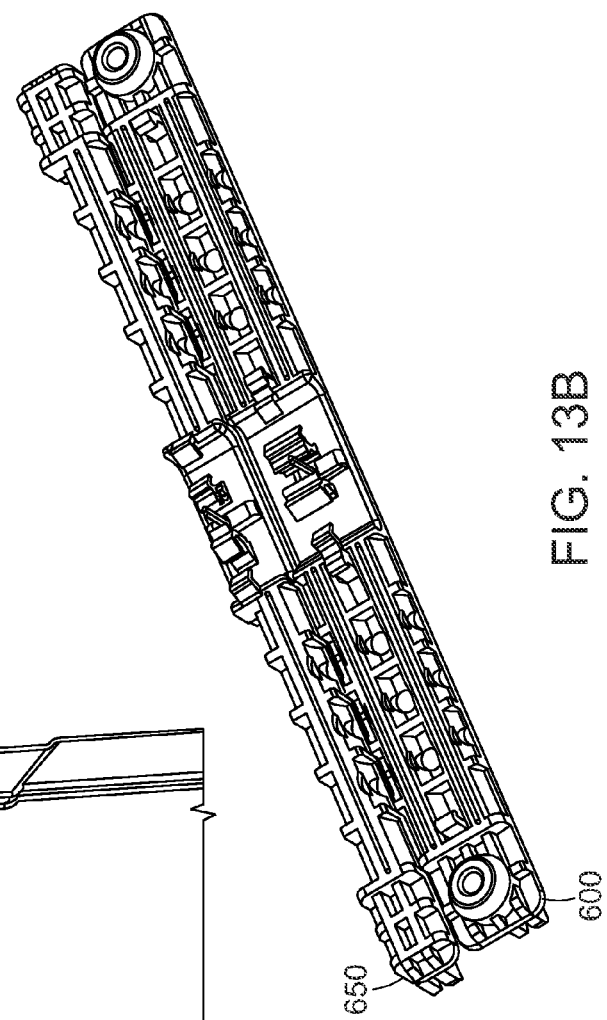

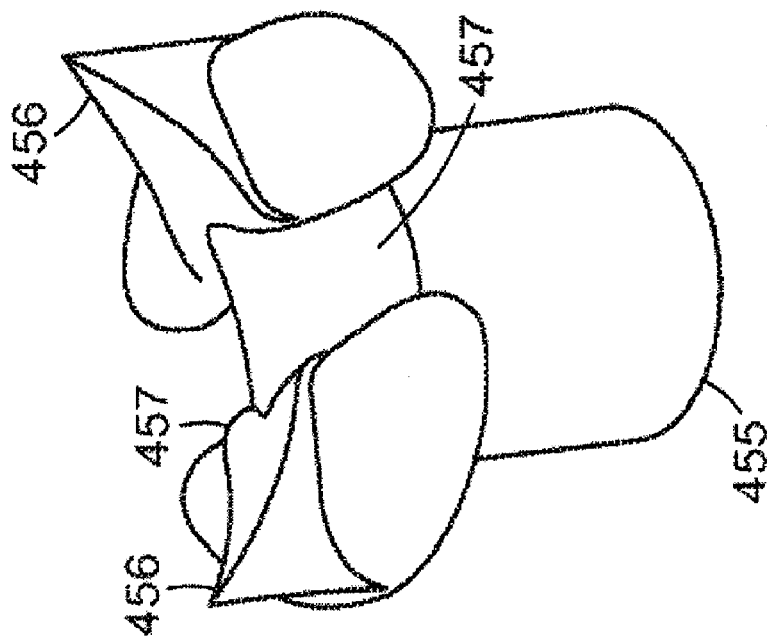
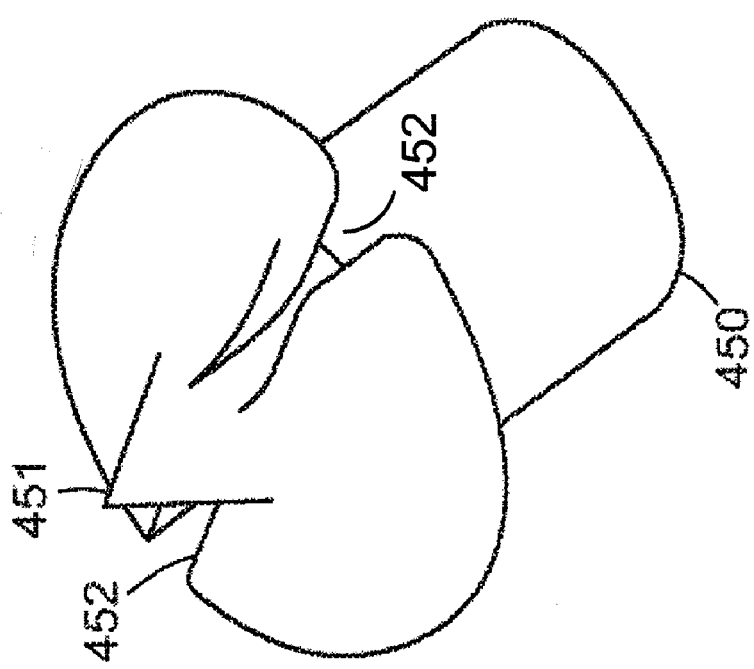
FIG. 23

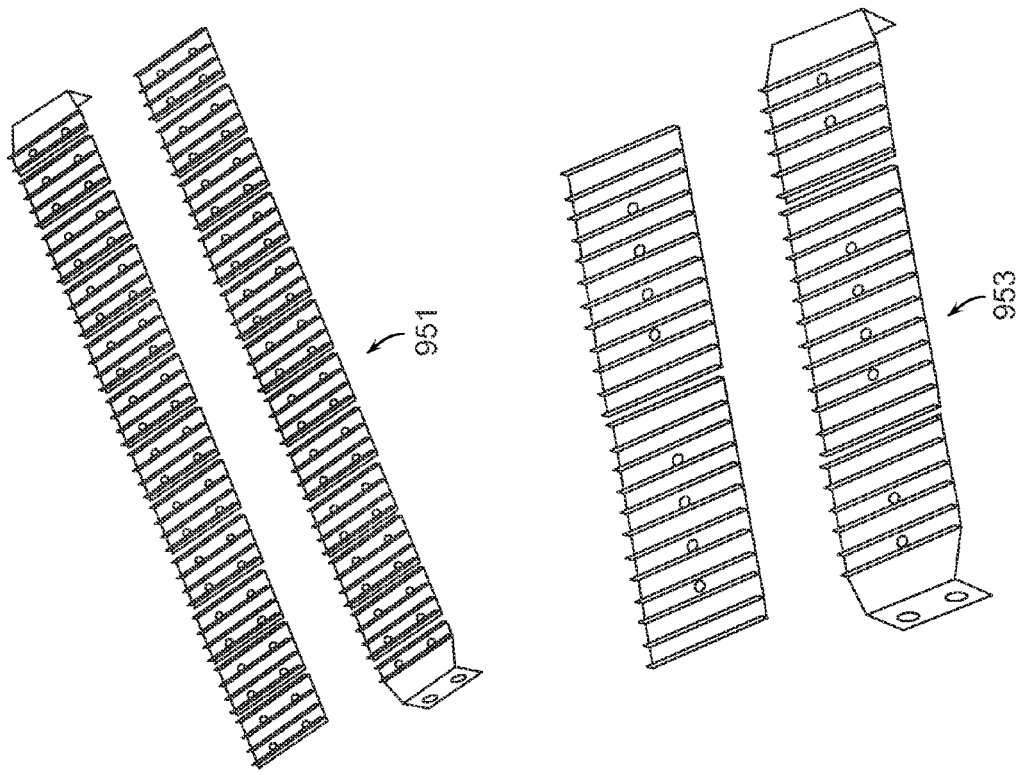
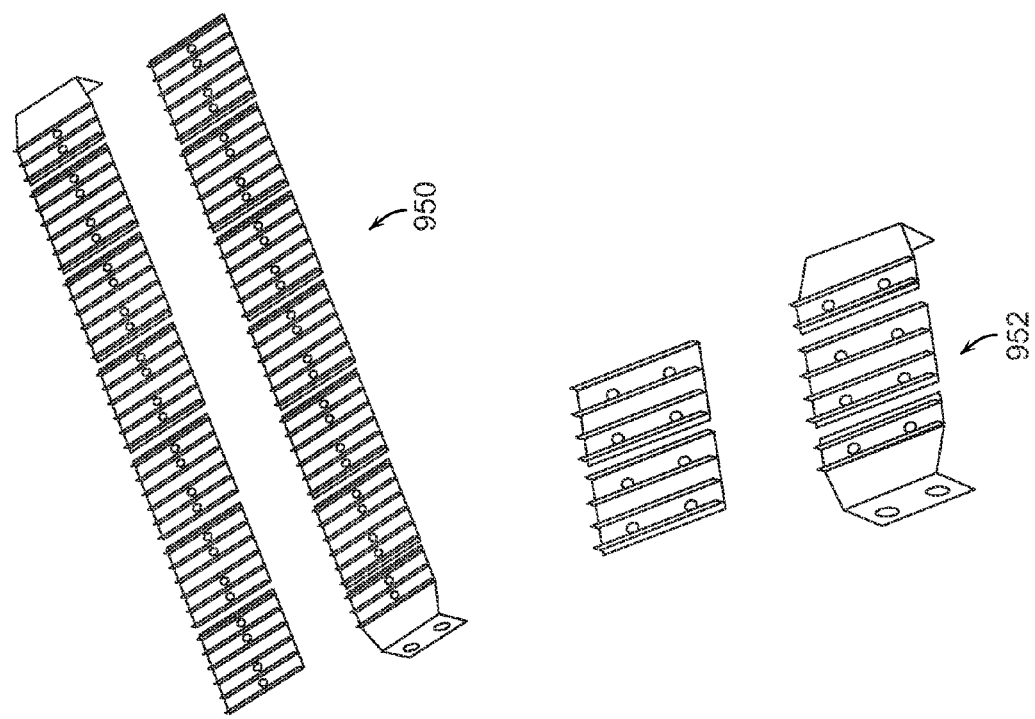
FIG. 24

PRISMATIC BATTERY MODULE WITH SCALABLE ARCHITECTURE

CROSS-REFERENCES TO RELATED APPLICATIONS

This application claims priority under 35 U.S.C. §119(e) to U.S. Provisional Application No. 61/143,976, filed Jan. 12, 2009 and entitled "Prismatic Battery Module With Scalable Architecture," the entire contents of which are incorporated herein by reference.

This application is also related to the following applications, filed concurrently herewith, the entire contents of which are incorporated herein by reference:

U.S. patent application Ser. No. 12/628,699, filed on Dec. 1, 2009, entitled "Methods of Welding Battery Terminals,"

U.S. patent application Ser. No. 12/628,733, filed on Dec. 1, 2009, entitled "Structure of Prismatic Battery Modules with Scalable Architecture,"

U.S. patent application Ser. No. 12/628,713, filed on Dec. 1, 2009, entitled "Safety Venting Mechanism For Batteries,"

U.S. patent application Ser. No. 12/628,780, filed on Dec. 1, 2009, entitled "Bi-metallic Busbar Jumpers for Battery Systems,"

U.S. patent application Ser. No. 12/628,796, filed on Dec. 1, 2009, entitled "Fuse For Battery Cells," and U.S. patent application Ser. No. 12/628,786, filed on Dec. 1, 2009, entitled "Busbar Supports And Methods Of Their Use for Battery Systems,"

TECHNICAL FIELD

The present invention relates to battery modules and scalable architectures for manufacturing battery modules.

BACKGROUND OF THE INVENTION

A 'battery module' is a subassembly that is typically installed inside a 'battery pack', which is an assembly that is installed in a terrain, marine, or aeronautic vehicle. These vehicles typically have a variety of high power electric loads, such as a computer-controlled power inverter driving an electric motor that is used for vehicle propulsion or some form of mechanical actuation.

A large group of battery modules can also be used by an electric utility company to help equalize a local power distribution network's worst-case supply fluctuation episodes. The modules are installed inside a 'battery station', which is a large rigid stationary weather-proof climate-controlled enclosure that is secured to a concrete foundation. The modules are mounted and electrically connected via racks with docks so that any module can be rapidly connected or disconnected.

Battery packs and battery stations typically have other subassemblies and components installed inside them in order to deliver complete end-item battery packs to vehicle manufacturers or complete end-item battery stations to electric utility companies. These subassemblies and components include electronic sensor modules, electronic control modules, electrical charging modules, electrical interface connectors, electrical fuses, electrical wiring harnesses, and thermal management means.

BRIEF SUMMARY OF THE INVENTION

In general, in one aspect, a battery system with a scalable architecture includes a group of subunits, each of which includes a heatsink and a battery cell having a top end and first and second voltage terminals which extend out of the top end of the battery cell, where the first and second terminals of each battery cell are symmetrically positioned with respect to a centerline of the battery cell, and where all of the battery cells among the plurality of subunits are arranged so that their first voltage terminals are aligned along a first row and their second voltage terminals are aligned along a second row. The system further includes a set of identical busbar supports equal in number to the plurality of subunits, where each busbar support has two slots and is mounted on a corresponding subunit, with each of the first and second terminals of the battery cell for that subunit extending up through a corresponding different one of the two slots. The system also includes a group of bimetallic busbars, each one supported by the busbar supports and electrically connected directly to either a first or second terminal of each of the battery cells of each modules on which those busbar supports are mounted.

Other embodiments include one or more of the following features. The battery cells used in the system are prismatic battery cells. Both the first row and the second row of terminals are situated on the same side of the battery system. Each of the subunits are identical to one another except for the orientation of each of the subunit's battery cells with respect to the cell's centerline. All of the heatsinks are identical to each other except one or two heatsinks Each of the busbars is electrically connected to at least two adjacent terminals in the same row of terminals.

In certain embodiments, the battery system includes two pressure plates where the subunits are arranged as a stack between the pressure plates. In one such embodiment, one or more compliant pads are located between the first pressure plate and the neighboring subunit. In another such embodiment, a band encircles the first and second pressure plates and the subunits.

In embodiments of the battery system, each of the plurality of subunits further comprises a second battery cell having a top end and first and second voltage terminals both of which extend out of the top end of the second battery cell, where the first and second terminals of each second battery cell being symmetrically positioned with respect to a centerline of that battery cell wherein each of the second battery cells among the plurality of subunits are arranged so that their first voltage terminals are aligned along the first row and their second voltage terminals are aligned along the second row.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein:

FIG. 9 shows a heatsink with attached pressure relief teeth.

FIG. 10 shows a view of a battery module pressure plate.

FIG. 13A shows a busbar support attached to a heatsink.

FIG. 13B shows an alternative busbar support to support one battery cell.

FIG. 23 shows pressure relief teeth.

FIG. 24 shows several arrangements of busbar components that may be used to achieve various configurations of battery modules.

DETAILED DESCRIPTION OF THE INVENTION

A battery module consists of an assembly of cell subassemblies, each containing prismatic battery cells, where the cells are electrically connected to the other cells in the module to form the battery module. The term 'prismatic' refers to the shape of the battery cell that is described herein and it differentiates this module from other modules with cylindrical battery cells.

Figure 1:
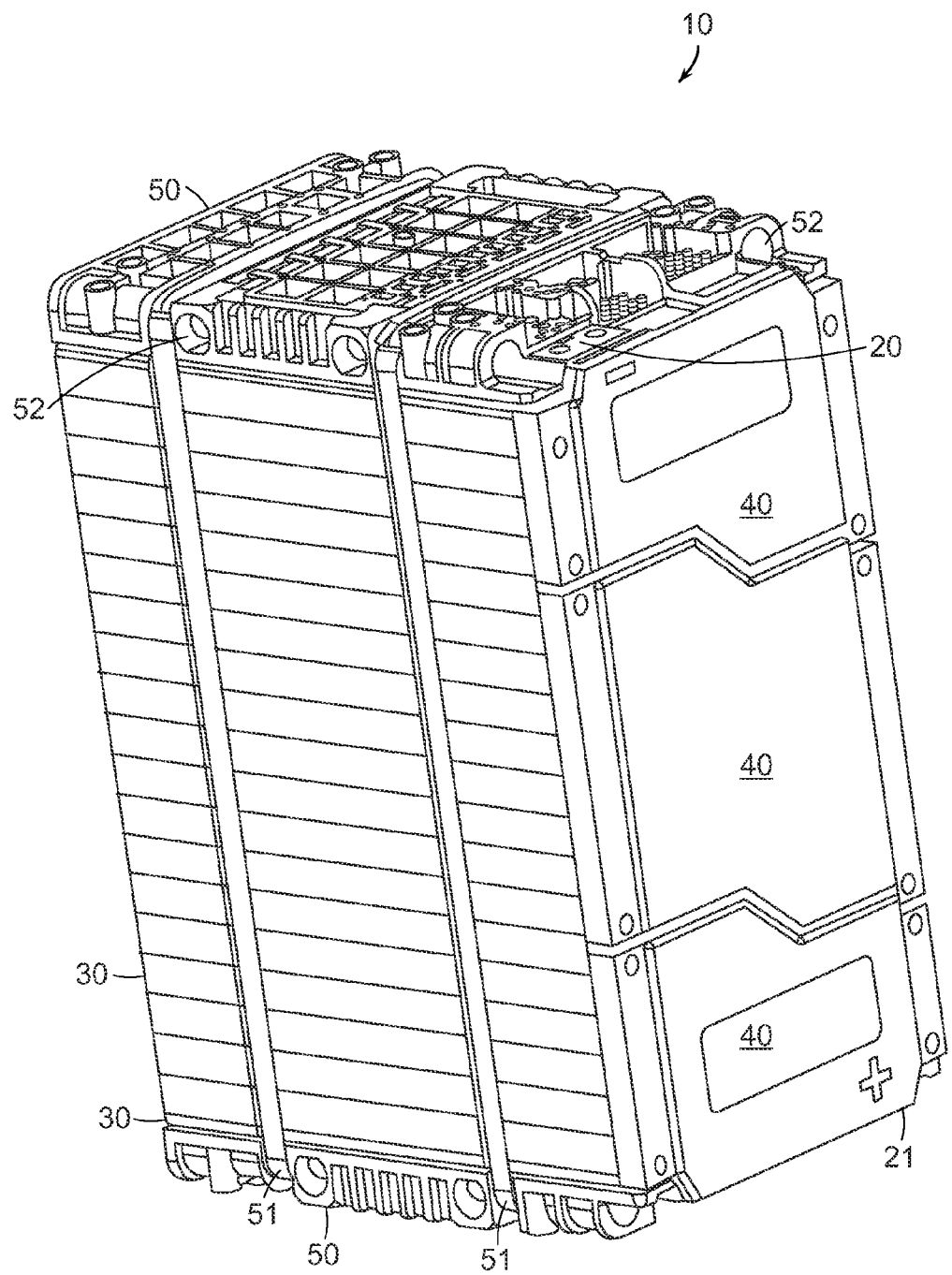
FIG. 1 shows a battery module.

FIG. 1 shows a battery module 10 with a negative terminal 20 and a positive terminal 21. The battery module 10 contains one or more cell subassemblies 30. As described in more detail below, the cell subassemblies are a basic building block from which battery modules of arbitrary scales may be constructed. The cell subassemblies contain prismatic battery cells (not shown), each of which provides a portion of the battery's electrical power and storage capacity. The cell subassemblies 30 are held together by pressure plates 50 and bands 51. Pressure plates 50 act as a mounting mechanism for the battery module, and contain one or more mounting passages 52 to allow the module to accept hardware (not shown) to mount the battery module 10 within, for example, a battery pack enclosure or on a battery station's rack in various mounting orientations. The individual battery cells are electrically connected in parallel and/or series by busbars (described below) which connect the cells to one another and to the terminals of the battery, all of which are on one side of the battery module. That side of battery module 10 is covered with one or more busbar covers 40.

Figure 2:
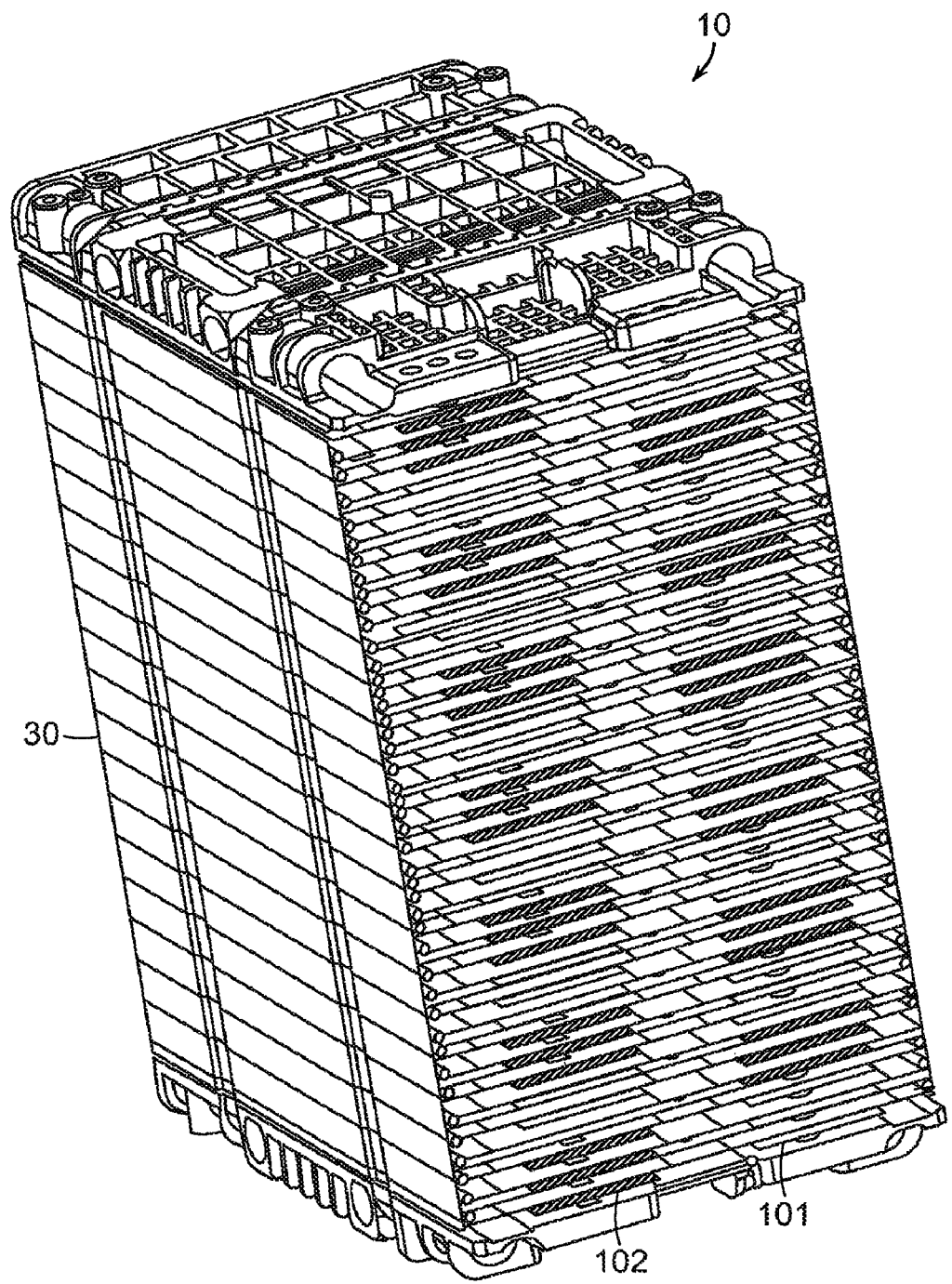
FIG. 2 shows a battery module with busbar covers and busbars removed and with cell subassemblies exposed.
Figure 3:
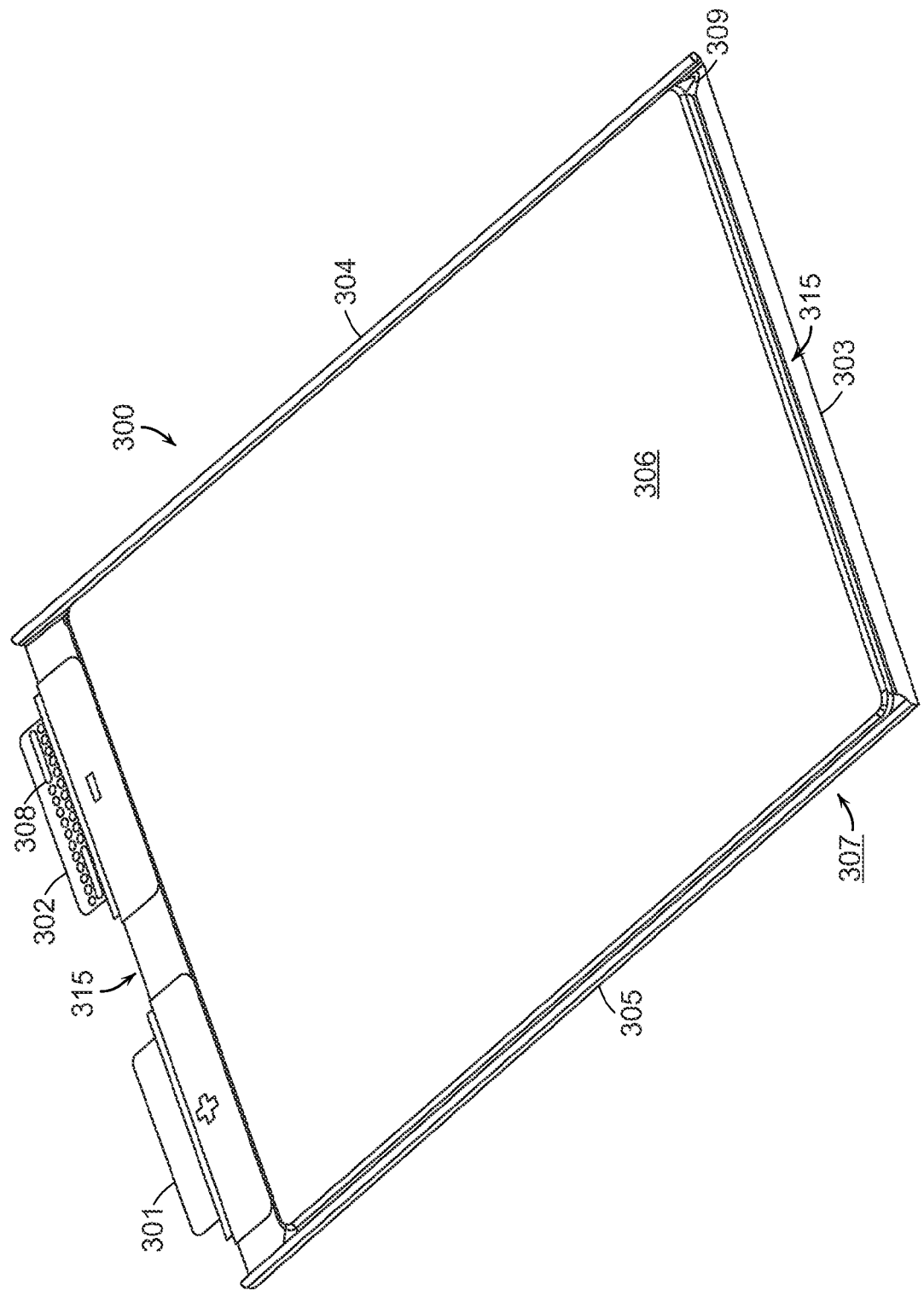
FIG. 3 shows a prismatic battery cell.

FIG. 2 shows a battery module 10 with busbars and busbar covers removed to reveal a view of the inside of cell subassemblies 30. Each subassembly, as shown in FIG. 3, contains one or two prismatic battery cells 300, each cell having a positive terminal 301 and negative terminal 302. Terminals 301 and 302 are connected electrically in series and/or parallel by busbar jumpers (not shown). Busbar terminals (also not shown) connect some of the battery terminals to either the battery module's negative terminal 20 or positive terminal 21.

The prismatic battery module described herein has a group of identical cells. The quantity of cells per module and the module's electrical connection configuration (parallel count versus series count) defines the module's electrical characteristics and performance ratings. For example, a module with a '23S3P' configuration has sixty-nine (69) cells, twenty-three (23) subgroups that are electrically connected in series, and three (3) cells in each subgroup that are electrically connected in parallel. Depending on the configuration, battery modules may contain either an even or an odd number of battery cells.

Prismatic Battery Cell

FIG. 3 shows a prismatic battery cell 300. A prismatic cell has two large flat surfaces, top surface 306 and bottom surface 307 (not visible), that are basically parallel to each other and which are used for mechanical retention and thermal management inside the module. The cell's enclosure may be referred to as a 'pouch' because it is a non-rigid flexible sheet that is folded and bonded to create a cost-effective environmentally-sealed housing. The pouch's material is a thin aluminum foil with a polymer coating applied to both surfaces. The pouch is folded at the bottom edge which provides a seal boundary 303. The polymer coated pouch is formed into a thermally-bonded flange at the two sides, which creates two more seal boundaries 304 and 305. This arrangement decreases the module's physical volume without a decrease in net performance. The side flange's size is selected so as to ensure long-term robustness. The cell's side flanges are folded to create a compact width.

The cell's two flat electrical terminals, positive terminal 301 and negative terminal 302, protrude from one of the pouch's edges and the terminals are environmentally-sealed using electrically-isolative polymeric perimeter seals. The remaining portion of the pouch's terminal edge is thermally-bonded to create a fourth environmentally-sealed boundary, which completes the cell's perimeter seal. The terminals are positioned symmetrically with respect to the center axis 315, and preferably the terminals are in the center plane of the battery cell. Accordingly, battery cell 300 may be "flipped" 180 degrees around center axis 315 with the result that each terminal is in the same position that the opposite terminal held prior to "flipping" the cell (relative to viewing the cell along axis 315 facing the edge containing the cell terminals). This symmetry allows one to stack up a series of cells without regard to whether the negative terminal is on the left or right side (as viewed along center axis 315), and in either orientation the resulting rows of terminals will each be aligned in a straight row, and thus may be easily interconnected to one another. Specifically, battery modules can be built with different combinations of series and parallel connections by (1) selectively orienting the battery cells so that the terminals on the same left/right side of adjacent battery cells have either the same or opposite polarities; and (2) electrically connecting groups of these adjacent terminals using busbar components (described below) with connections between terminals of opposite polarities forming series configurations and connections between same-polarity terminals forming parallel configurations. The negative terminal's material is copper and the positive terminal's material is aluminum to compliment the cell's chemistry and internal construction. The terminal length is small compared to other commercially-available designs. The opportunity to use compact terminals is clarified in the subsection entitled 'Busbar Components'. For the purpose of explanation, ancillary negative and positive symbols have been added to the cell of FIG. 3.

The battery cell's non-rigid flexible pouch will physically expand if a worst case electrical overload incident occurs. Pressure relief (also known as out-gassing) during an electrical overload incident may be provided through the use of a "tooth" mounted externally to the cell, either as alternative to or in combination with pressure relief vent feature 309. The tooth will puncture the cell in a controllable manner if the cell were to expand into contact with it. This tooth is described further below.

Figure 4:
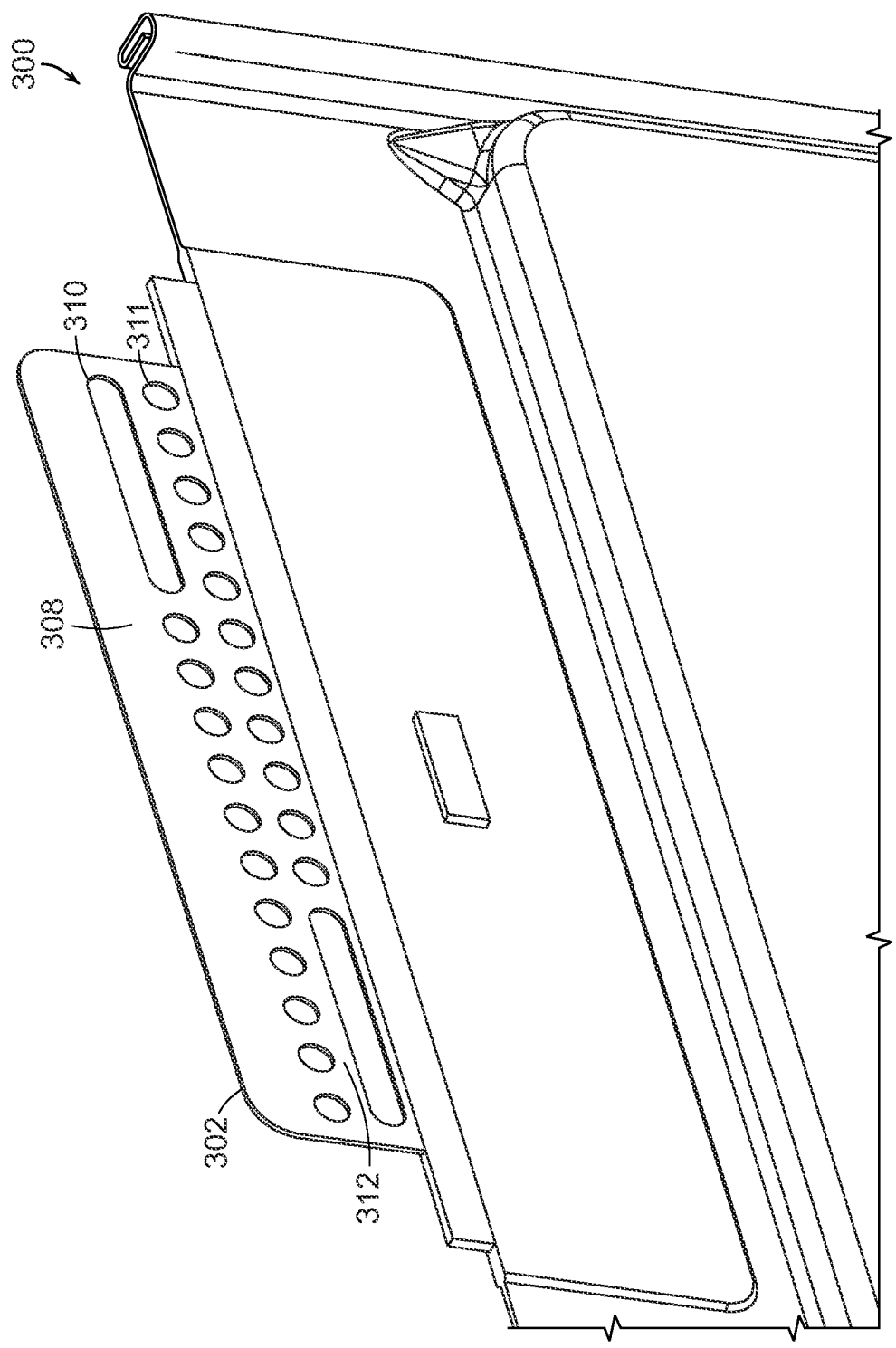
FIG. 4 shows a zipper fuse of a prismatic battery cell.

FIG. 4 shows zipper fuse 308 integrated into an electrical terminal 302 of battery cell 300. Zipper fuse 308 includes two rows, each row made up of a slot-shaped hole 310 at one end of the row and circular-shaped holes 311 between the slot-shaped hole 310 and the other end of the row. This fuse is referred to as a 'zipper' fuse because looks like a zipper. The zipper fuse is incorporated in the cell's negative terminal. The geometry, number and position of the zipper fuse slot holes 310 and circular holes 311 are selected so that the fuse actuates within a specified time period that prevents a cascading failure mode with the adjacent cells or potentially all of the cells in a module. Specifically, the fuse slot holes help to ensure a consistent pattern of fuse activation by concentrating current "hot spots" near the region around the holes, to promote fuse activation to start in those areas. The use of circular holes in addition to the slots helps, among other things, to maintain the structural integrity of the terminal prior to fuse activation. The positioning of the two parallel rows of slot holes and circular holes creates a region 312 between the rows that is partially thermally isolated from the remainder of the terminal, which concentrates the heat developed during fuse activation to help make the activation more complete and consistent.

Battery Subassembly

Figure 5:
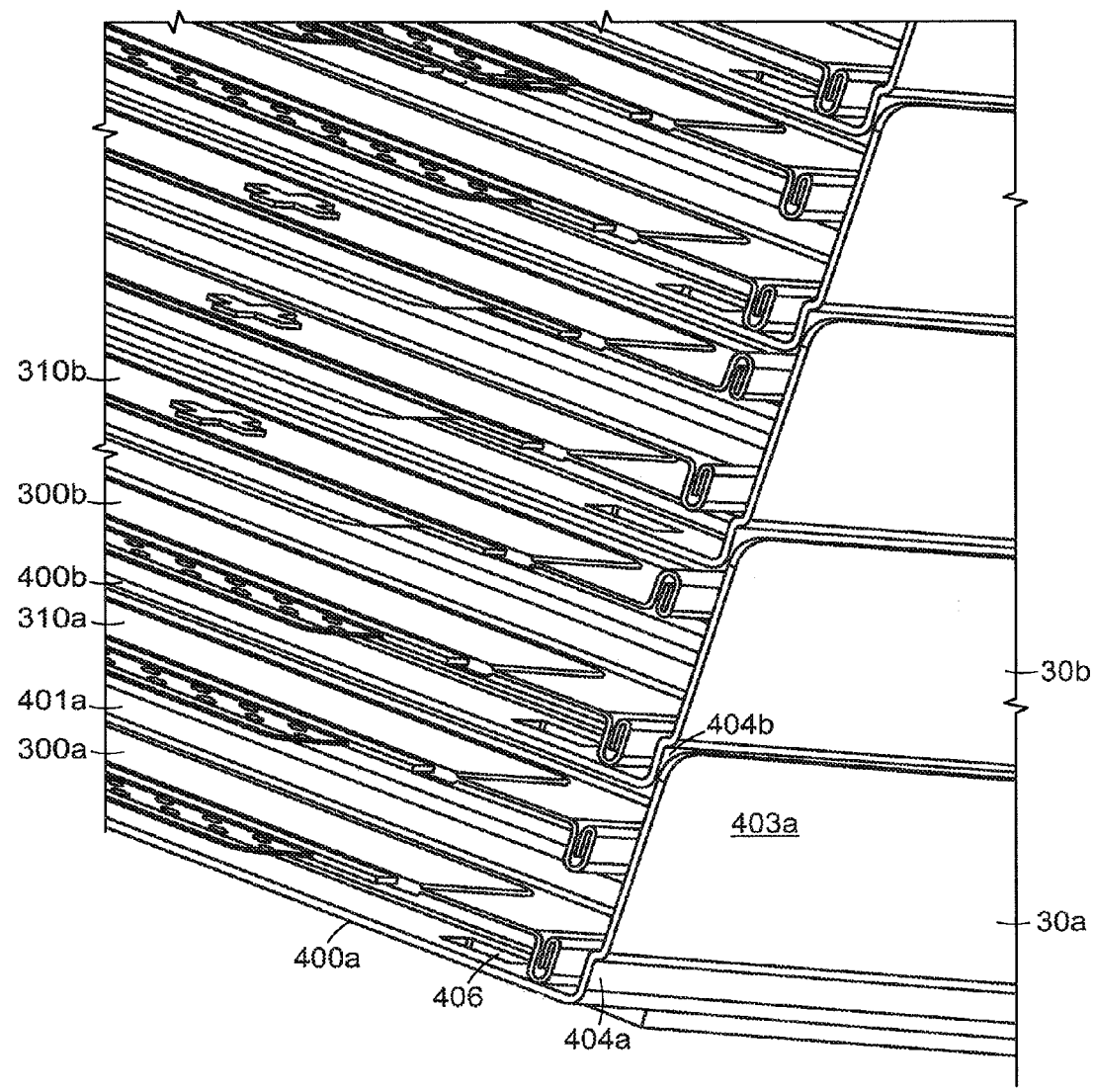
FIG. 5 shows a more detailed view of a cell subassembly.

FIG. 5 shows a group of cell subassemblies, including subassemblies 30a and 30b. Subassembly 30a includes a heatsink 400a having two large, flat surfaces, as well as a battery cell 300a which also has two large, flat surfaces. Battery cell 300a is adjacently mounted to heatsink 400a such that the second large, flat surface of battery cell 300a abuts the first large, flat surface of heatsink 400a. Subassembly 30a also includes a compliant pad 401a having two large, flat surfaces and a second battery cell 310a having two large, flat surfaces. Compliant pad 401a is adjacently mounted to battery cell 300a such that the first large, flat surface of battery cell 300a abuts the second large, flat surface of compliant pad 401a. Compliant pad 401a is also adjacently mounted to battery cell 310a such that the first large, flat surface of compliant pad 401a abuts the second large, flat surface of a second battery cell 310a. This arrangement forms a repeating "cassette" configuration of a battery cell, a heatsink, another battery cell, and a compliant pad, followed by another grouping of a battery cell, a heatsink, another battery cell, and a compliant pad, and so on. Compliant pad 401a helps to distribute pressure between the subassemblies when they are banded together between the pressure plates, as well as allowing expansion/contraction of cells during use. Similarly, subassembly 30b is mounted adjacently to subassembly 30a. Subassembly 30b includes a heatsink 400b having two large, flat surfaces, as well as a battery cell 300b which also has two large, flat surfaces. Heatsink 400b is adjacently mounted to battery cell 310a such that the first large, flat surface of battery cell 310a abuts the second large, flat surface of heatsink 400b. Battery cell 300b is adjacently mounted to heatsink 400b such that the second large, flat surface of battery cell 300b abuts the first large, flat surface of heatsink 400b. Subassembly 30b also includes a compliant pad 401b having two large, flat surfaces and a second battery cell 310b having two large, flat surfaces. Compliant pad 401b is adjacently mounted to battery cell 300b such that the first large, flat surface of battery cell 300b abuts the second large, flat surface of compliant pad 401b.

As shown in both FIG. 5 and FIG. 2, all of the heatsinks are bonded to the adjacent cells during the module's assembly process via a dispensed cure-after-assembly adhesive that is also used to bond the compliant pads to the adjacent cells. The group of cells, pads, and heatsinks creates the main stack subassembly for every module, which fosters a scalable architecture. In other words, one can readily change the size of the module by simply adding or subtracting identical subassemblies. The subassemblies may or may not be pre-assembled as such and then later assembled together as sub-units into the battery module's main stack. The assembly of the main stack may be accomplished as a one-step process where all of the battery cells, heatsinks and compliant pads are assembled together in one process. The concept of a 'subassembly' is used as a convenient label for a logical group of components when describing the overall structure of the battery module.

Also as shown in FIG. 5, each of the battery cells (e.g., 300a, 310a, 300b and 310b) are mounted on respective heatsinks (e.g., 400a and 400b) with their positive terminals oriented on the left or right as viewed end on at the terminals. For example, in FIG. 5, battery cells 300a, 310a, and 300b are each oriented with their negative terminals to the right from the perspective of FIG. 5, while battery cell 310b is mounted with its positive terminal to the right. Other orientations of groups of battery cells (e.g., flipping battery cell 310b 180 degrees so that its positive and negative terminals exchange positions) allow different combinations of series or parallel connections between the terminals depending on which groups of adjacent terminals are electrically connected by the busbar jumpers and terminals described below.

Figure 6:
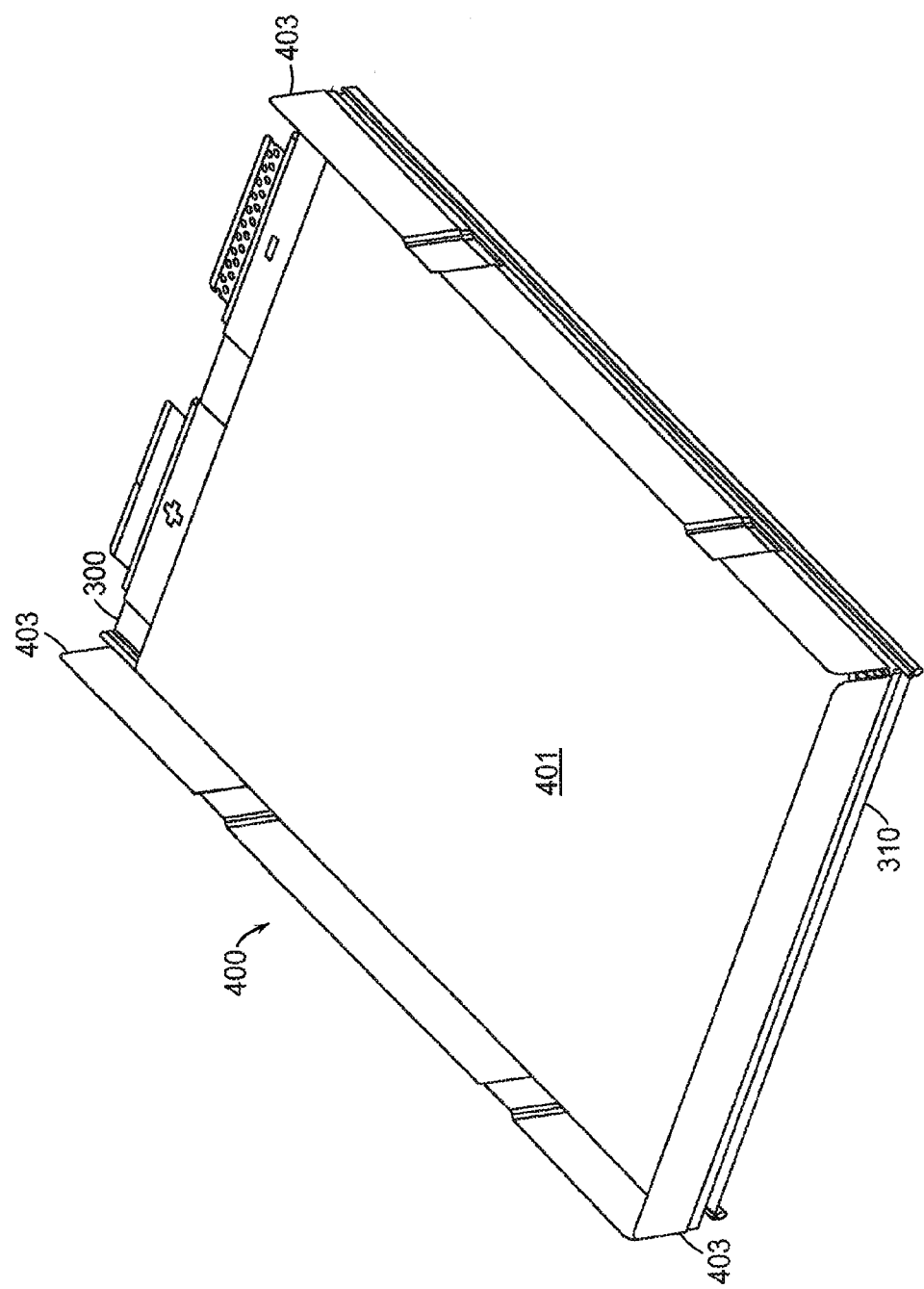
FIG. 6 shows another view of a cell subassembly.

FIG. 6 shows a view of a cell subassembly 30 from which battery module 10 is built. FIG. 6 shows a heatsink 400 joined to a battery cell 300, which in turn is joined to a compliant pad 401. FIG. 6 does not show the adjacent cell that would be joined to compliant pad 401 as described above and in FIG. 5. Referring still to FIG. 6, when subassembly 30 is stacked adjacent to another subassembly, the metallic heatsink 400 contacts two cells 300 and 310. Each cell contacts the heatsink via one of the cell's two flat surfaces to facilitate thermal management via conduction or forced convection heat transfer. This results in requiring only about half the number of heatsinks per module as compared to using a heatsink for each cell. The benefit is a compact module which has an improved power output/physical volume ratio compared to other commercially available modules some of which have larger and more elaborate heatsinks The heatsink is made from an aluminum sheet that is stamped and formed using standard tooling practices. The heatsink has an electrically-isolative coating to ensure that a worst-case electrical overload incident does not allow an electrical short circuit path to any or all of the heatsinks. The coating thickness is preferably chosen so as to not substantially impede heat transfer. Protective coatings and application processes may be selected to simultaneously provide the electrical short circuit protection during an electrical overload incident, permit effective heat transfer, and reduce cost.

Another function of the heatsink is to protect the cells from foreign objects during a severe vehicle crash. As discussed previously, the heatsink's formed wings 403 nest with an adjacent heatsink's profile to provide a satisfactory level of cell protection with respect to complexity, cost, and the module's physical volume. These wings are formed by folding three of the heatsink's edges at approximately a right angle to the large flat surfaces of the heatsink.

Referring now to FIG. 5, an indentation (404a, 404b) is formed from the heatsink by using additional bends near the area of the wing that meets the large flat surfaces of the heatsink to receive a portion of an adjacent heatsink's wings. For example, indentation 404b is formed to receive a portion of wing 403a. This makes the heatsinks with their internal components easier to stack on top of one another. The battery pack's enclosure may be the major protection barrier during a crash, so the heatsinks are another barrier to further improve the battery module's safety capability.

A second type of heatsink with short formed wings that envelop only one battery cell (as opposed to the "full-height" heatsinks that envelop two cells) is used if a module has an odd cell count, where the second type of heatsink is located at one end of the stack of subassemblies. In these odd cell count configurations, no battery cell is attached to the bottom of the bottom-most heatsink, as is shown in FIG. 5.

Figure 7:
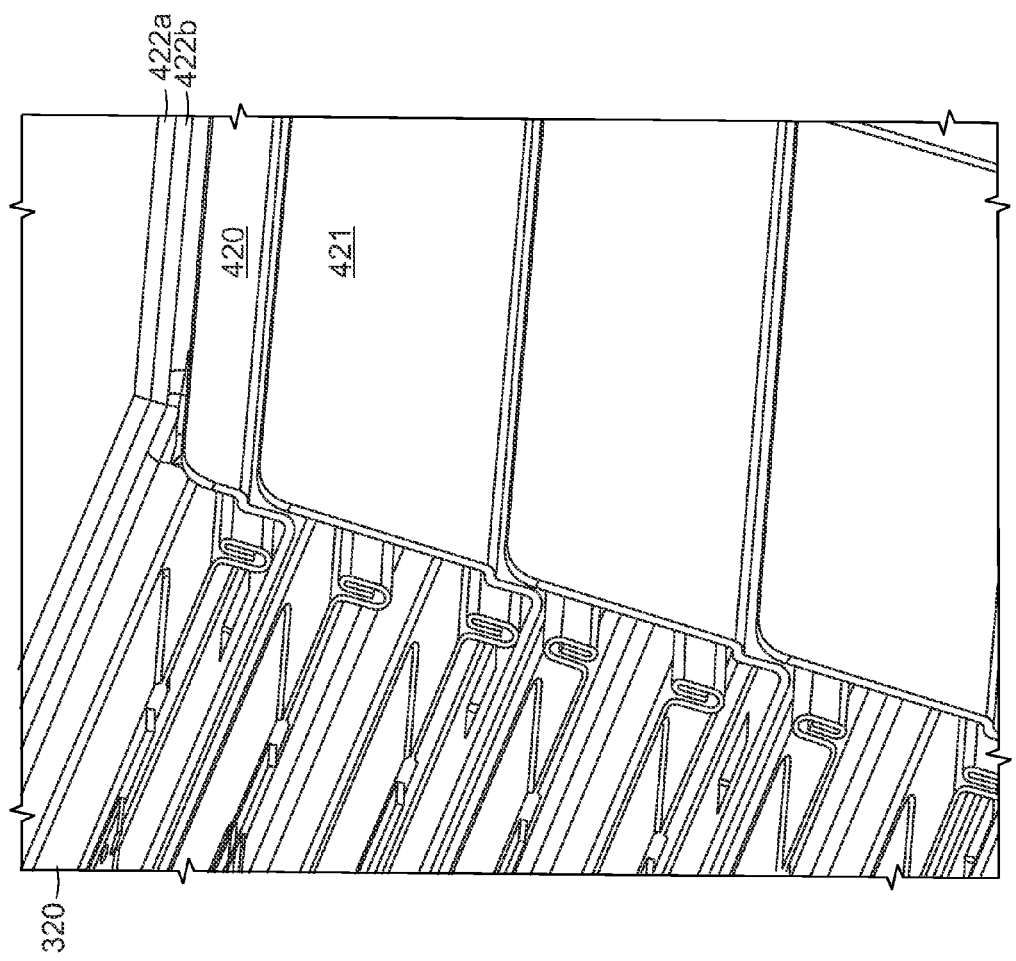
FIG. 7 shows an alternative heatsink and cell subassembly.

FIG. 7 shows this second type of heatsink 420 that nests into an adjacent cell subassembly 421. Heatsink 420 is joined to battery cell 320 in the same manner as the full-height heatsinks are attached to adjacent cells. FIG. 7 also shows the use of two compliant pads, 422a and 422b, which are used at both ends of a module's main stack in order to distribute and equalize the clamp force imparted to the stack by the pressure plates. This second type of heatsink is also used if a module has an even cell count, but even cell count modules also use a third type of heatsink.

Figure 8:
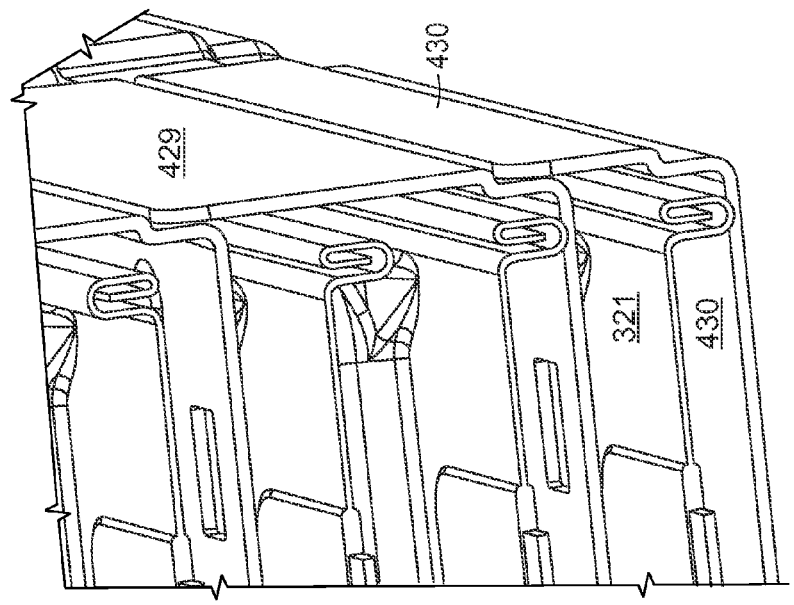
FIG. 8 shows another alternative heatsink and cell subassembly.

A third type of heatsink with medium-height formed wings that envelop only one battery cell may also be used if a module has an even cell count, where the third type of heatsink is located at one end of the stack of subassemblies opposite the end with the second type of heatsink. In these even-cell-count configurations, this third type of heatsink is nested adjacent to a heatsink that would otherwise have an exposed battery cell. For example, referring to FIG. 8, this third type of heatsink 430 rests beneath the lower-most heatsink 429 to help protect a single battery cell 321 located between heatsinks 429 and 430. Two compliant pads (not shown) are adjacently mounted to each other, and one side of one of the compliant pads is adjacently mounted to heatsink 430 at the end of the module's main stack of subassemblies.

While these additional types of heatsinks cause additional components to be released and produced in the manufacturing process, they fully respect the principle that a heatsink contact every cell via one of the cell's two large flat surfaces, and that every cell be protected from foreign objects during a severe vehicle crash.

FIG. 9 shows a heatsink 400 with pressure release teeth 410 and 411 mounted through holes in the heatsink. One tooth 410 is oriented so that its sharp end points toward one of the heatsink's attached battery cells, and if a second cell is joined to the heatsink, the other tooth 411 is pointed toward that cell. An additional pair of teeth may be positioned elsewhere on the heatsink 400 or on the busbar support connected to the heatsink. The tooth's material is molded plastic and it is either heat-staked or ultrasonically-welded to a plain hole in the stamped aluminum heatsink. If an electrical overload incident occurs, the cell's non-rigid flexible pouch will physically expand due to rapid internal gas generation. As it expands, the force of the internal pressure will press the pouch against the tooth, puncturing the cell and providing a controlled relief of the internal pressure. The battery cell has a port that helps define a specific region in which the pouch can expand, and within which the sharp point or edge of the tooth is at least partially situated to puncture the pouch when it expands. Although the battery cell can expand along multiple expansion paths, the port helps to define and promote expansion along at least one such path. The expansion of the pouch may be also be partially controlled by creating a region of the pouch of increased expandability relative to the rest of the battery cell. In some embodiments the port may expose a region of increased expandability. In any of these embodiments, the sharp point of the tooth is situated along at least one of the expansion paths of the pouch.

FIG. 23 shows two additional alternative embodiments of pressure release teeth. Tooth 450 includes a point 451 and two channels 452. Tooth 455 includes two points 456 and two channels 457 extending away from the region of the point. The structure of tooth 455 (along with other embodiments that use a sharp edge instead of a point) may help promote the formation of a 'tear' or rip in the pouch to promote gas escape. In each of these types of teeth, the channels help to provide a path for the gases to escape from the battery cell and to ensure the pouch does not inadvertently re-seal itself closed (despite the puncture) against the tooth. Other orientations and combinations of sharp points and channels may also be used, as may other combinations of sharp edges and/or channels.

The tooth is produced from a non-conductive material to help prevent a short between the interior of the battery cell and the heatsink.

As indicated in FIGS. 5 and 6, a compliant pad 401 contacts every cell via one of the cell's two large flat surfaces to provide the following functions: (a) Provide uniform pressure distribution for cell life and performance, (b) provide constant pressure on the cell's active area throughout the life of the cell, (c) compensate for the cell's thickness changes due to the inherent nature during charge and discharge cycles, and (d) compensate for the module's length changes due to the thermal expansion and contraction of the cell and other module components such as the heatsinks, pressure plate, and clamping bands.

Pressure Plate Component

FIG. 10 shows a pressure plate 50. Pressure plate 50 is a rigid structure imparts a static clamp force to the module's main stack of cells, compliant pads, and heatsinks. The structure also provides means by which the module can be attached inside a battery pack's enclosure. This component may be referred to as a 'pressure plate' to accentuate the primary function. The plate's material is a molded plastic polymer with defined temperature exposure and flammability ratings. The plate has a prominent flat surface to mate with one end of the module's main stack, which has two compliant pads at both ends to help distribute and equalize the clamp force.

The side of pressure plate 50 that faces away from the subassemblies has a matrix of reinforcing ribs 520 to enhance its structural rigidity and complement the molded part design practice of targeting a uniform wall thickness. The matrix has a non-uniform pattern because the ribs also form pockets which accommodate large electronic components that are soldered to the module's active control printed-circuit board (PCB) subassembly (not shown). The PCB subassembly includes a circuit board and components, where the majority of the components are on one side of the board. The PCB subassembly is mounted component-side down on pressure plate 50. The nesting of the electronic components preserves valuable space and contributes to a compact module length at the plate, which helps achieve an excellent power output to physical volume ratio. The plate's pockets are also valuable because they can be used as receptacles for vibration dampening elements (not shown) to grip the upper surfaces of the large electronic components that are soldered to the module's active control PCB subassembly. The elements prevent excess stress and fatigue at the solder joints on the PCB. The preferred vibration dampening element is a die-cut pad with an elastomeric closed-cell non-hydroscopic polyurethane foam material and pressure-sensitive adhesive material on one side, which both have defined temperature exposure and flammability ratings.

The PCB assembly may be either passive or active. Passive PCB assemblies may be sufficient for smaller battery modules, while larger modules use one or two active PCB assemblies, with one assembly mounted on each of the pressure plates at each end of the module. The active PCB control subassembly has three right-angle PCB electrical connector headers that are selectively-soldered to industry-standard plated through holes in the PCB. All other electronic components are SMT (Surface Mount Technology) devices which are reflow-soldered to industry-standard pads on both sides of the PCB. Precautions are taken to ensure a proper electrical isolation between the module's steel bands and the PCB because the bands are routed nearby. PCB trace, via, and component keep-in and keep-out zones are carefully defined for both sides of the PCB to avoid electrical interference. The module's life capability may be improved by applying a silicone-based or polyurethane-based conformal coating to both sides of the PCB, which will reduce the growth of dendrites between adjacent low-current high-impedance copper traces.

Side 510 of pressure plate 50 is opposite the side with the matrix of reinforcing ribs 520, and faces the stack of subassemblies. Side 510 may be flat, or may form a non-flat shallow convex or concave domed profile to further optimize the force distribution within the module's main stack.

Pressure plate 50 has two shallow tracks 501 to receive thin steel retention bands which impart the static clamp force to the module's main stack. The tracks have a domed profile to help distribute and equalize the clamp force. Appropriate dome profiles may be determined by measurements taken using existing sensing products specifically developed and marketed for this type of instrumentation application.

Pressure plate 50 also has four passages with recessed sockets 503, 504, 505, and 506 (also known as counter-bores) to receive steel fastener components such as cylindrical sleeves, washers, bushings, and retention bolts to foster a flexible attachment strategy. The present configuration permits a module to be mounted inside a battery pack's enclosure or on a battery station's rack via one of three mounting orientations, which is adequate for the majority of existing and predicted applications and customer requirements.

The pressure plate may be formed from two separate portions which are vibration-welded together. Each portion would have half of the attachment hole and recessed socket profiles. After welding, complete circular holes and sockets would be formed. The benefit of this approach would be that the two portions could be molded without long active slides in the molding tool that are perpendicular to the tool's principle die draw direction.

Pressure plate 50 has two recessed areas 508 to receive a steel busbar nut or nuts (not shown). The nut's design is intentionally simple to be a cost-effective solution. The nut has three threaded holes for attachment. The center hole grips a steel fastener (not shown) that retains the busbar nut to the pressure plate. The two other holes grip steel fasteners that attach an external power lug and wiring harness to the module's negative or positive busbar, which are explained in subsequent sections.

Band Component

Figure 11:
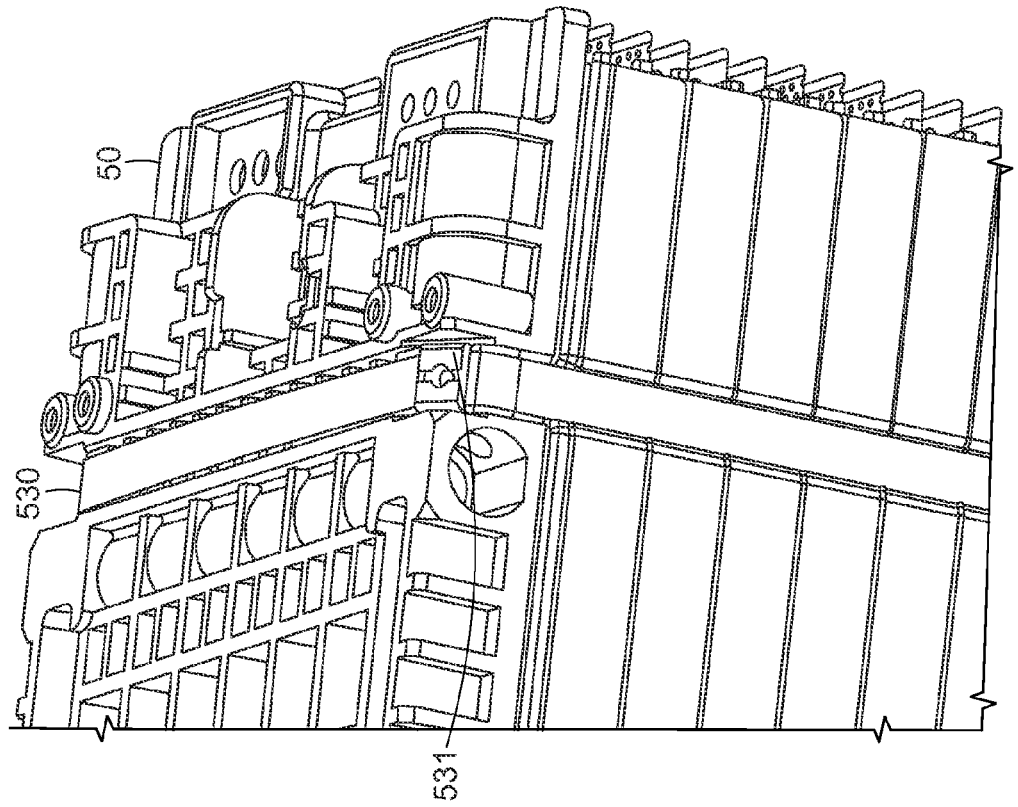
FIG. 11 shows a portion of a band component of a battery module.

FIG. 11 shows steel band 530, which is one of two steel bands used to envelop the module's main stack of cells, compliant pads, heatsinks, and pressure plates. Each steel band 530 sits in one of the shallow tracks 501 of pressure plate 50. Two bands are sufficient and three bands are not necessary, if the module has seventy-six (76) cells or less. More bands can be used if desirable. The length of steel band 530 is defined by the required clamp force to properly compress all of the compliant pads in the main stack, and it is retained via an existing released and qualified steel buckle 531 that is permanently crimped onto the band. A hand-held pneumatic applicator with a pneumatic actuator may be used to tension the band and crimp buckle 531, and the applicator may also have a mechanism to trim the band's extra tail after buckle 531 is crimped. Compared to an alternative approach that uses very long steel tie rods and retention nuts at both ends, using the bands and buckles is a more compact approach. The use of the same band and buckle and installation process for every module fosters a scalable architecture. Another approach is to tension and weld the band, instead of using the crimped buckle. The pressure plate 50 may incorporate flat or indented areas within the shallow tracks 501 to accommodate the clamping band buckles and to more evenly distribute the pressure in the region of the buckles. Pressure plate 50 may also have four corner rounds along each track 501 to ensure that the tensile forces are equalized in the straight portions of the two bands.

An existing released and qualified hand-held computer-controlled electric applicator with a closed-loop servo control may be used instead of the standard pneumatic actuator. This may increase applied static clamp force precision and reduce band installation and buckle crimping process cycle times. While the pressure plates and bands help hold the battery module together physically, the module's busbars (described next) connect the system electrically.

Busbar Support Component

The electrical interconnection between the module's adjacent cells is an important feature, which includes the registration of the flexible and fragile cell terminals relative to each other, and includes preventing an accidental contact between adjacent terminals that will not be electrically connected for the intended application. FIG. 2 shows how all of the cells are securely retained and registered relative to each other in the module's main stack, except for the cell terminals, e.g., 101 and 102.

Figure 12:
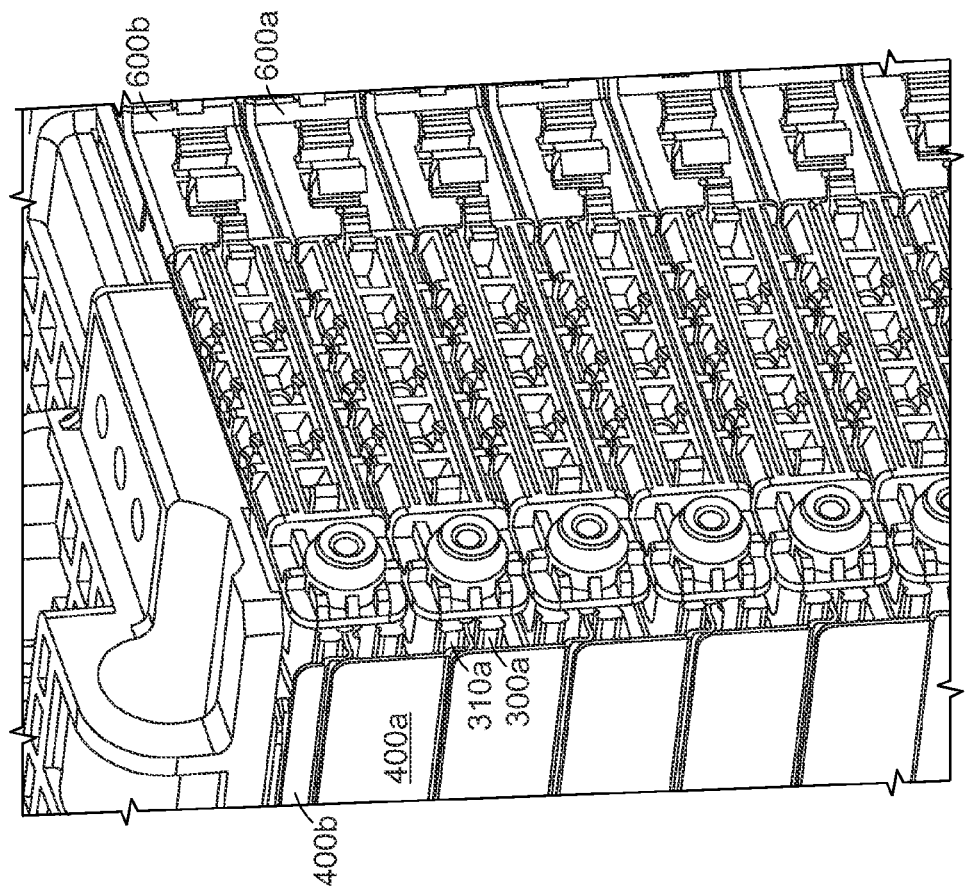
FIG. 12 shows several busbar supports, attached to cell subassemblies in a battery module, including a reduced-height cell subassembly.

FIG. 12 shows a robust, compact, and cost-effective solution using a molded plastic component. The component may be referred to as a 'busbar support' to accentuate its primary function. The standard busbar support 600a mates with the upper edge of one heatsink 600a and also envelops the two cells 300a and 310a. Cells 300a and 310 are each affixed to respective a side of the heatsink, and each has two electrical terminals (the negative terminals of each battery cell 300a and 310a are shown in FIG. 12) which extend through ports in the busbar support. A busbar support is used for every subassembly and fosters a scalable architecture. For example, busbar support 600b mates with the edge of the second type of heatsink, heatsink 400b.

FIG. 13A shows another view of a busbar support 600 mounted to heatsink 400. The standard busbar support has nine features/functions:

1. Seven flex tabs 608 (four shown) as well as two wedge-shaped latches 609 to grip two slots (component 406 in FIG. 5) in a heatsink.
2. Rectangular central port 604 to interface with a thermistor 605 that has an over-molded elastomeric grip.
3. Four tapered ports 601 to permit the simultaneous insertion and registration of four cell terminals.
4. Main body 610 that supports a busbar during a cell zipper fuse actuation incident. By maintaining a separation between any remainder of the terminal and the busbar, the busbar support prevents an accidental reconnection of the faulty cell to the busbar, which could cause a cascading failure mode with the adjacent cells.
5. Two fixed latches 602 and two flex latches 603 to grip two separate busbar components (not shown) during the laser welding of the busbars to the cell terminals. This feature helps eliminate the need for a special laser welding fixture. As described below, it functions as an assembly jig that secures the busbar components in registration with the cell terminals prior and during welding. These latches retain each busbar component in a substantially fixed position relative to the heatsink and the attached battery cells. The tapered ports and main body retain the terminals of each of the battery cells in a substantially fixed position relative to the heatsink and to the busbar component.
6. Eighteen reliefs 607 to ensure adequate clearance to any busbar electrical connection rivet.
7. Central channel 606 to permit the routing of the module's voltage sense wiring harness and thermistor wiring harness.
8. Four flex fingers (611) to retain the two wiring harnesses (not shown) before the busbar covers are installed.
9. Two screw bosses 612 at the ends for the attachment of the busbar covers.

Figure 16:
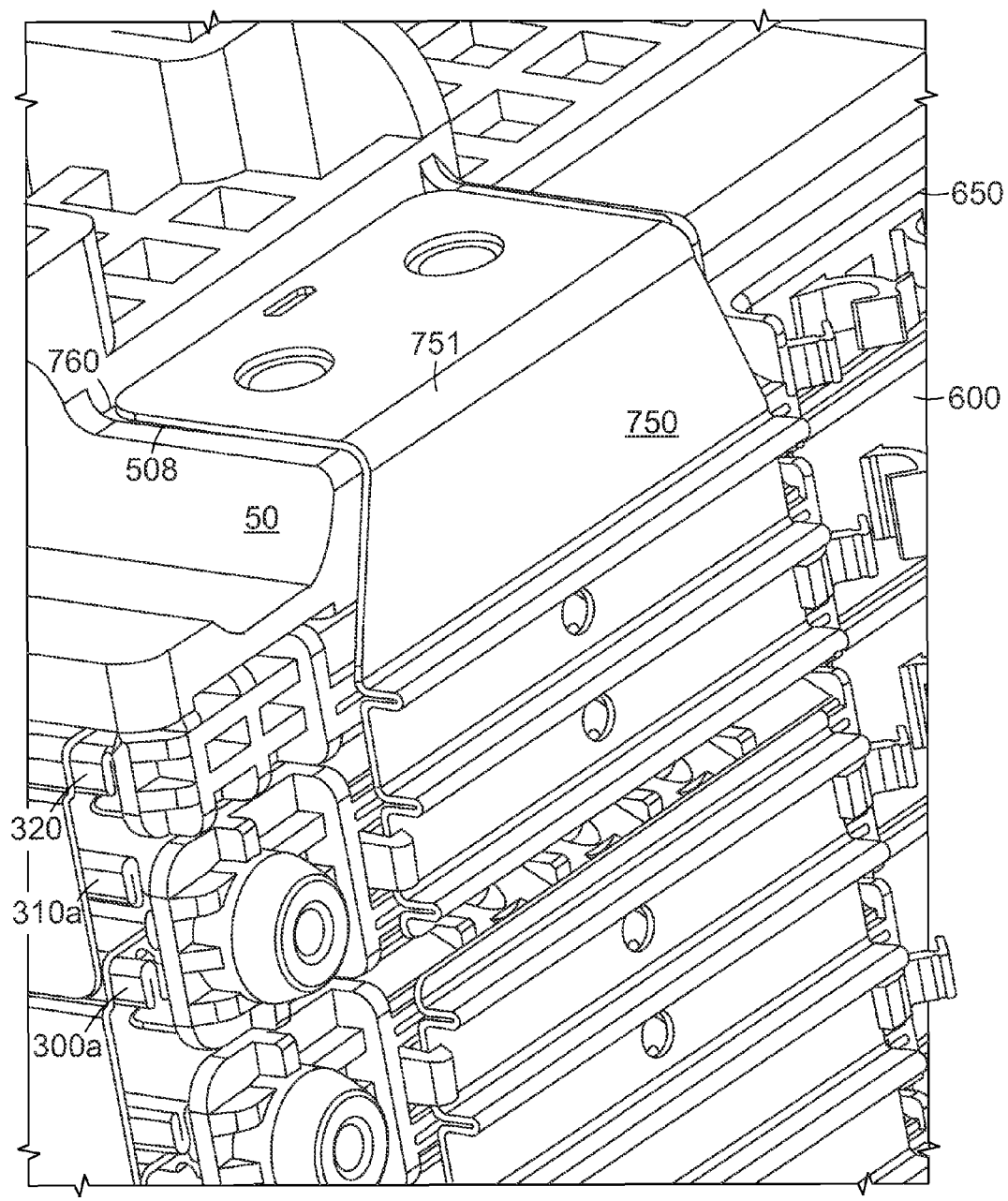
FIG. 16 shows a busbar terminal in relation to pressure plate and cell subassemblies.

In addition, FIGS. 13B and 16 show a second busbar support 650 that has been developed to envelop only one cell if a module has an odd cell count. While this decision causes another component to be released and produced, it fully respects the principle that every cell terminal be registered and protected from an accidental contact with an adjacent terminal. The module's vibration endurance robustness may be improved by adding two or more additional slots in the heatsink near the center and/or adding two more wedge-shaped latches in the busbar support.

Busbar Components

Figure 14:
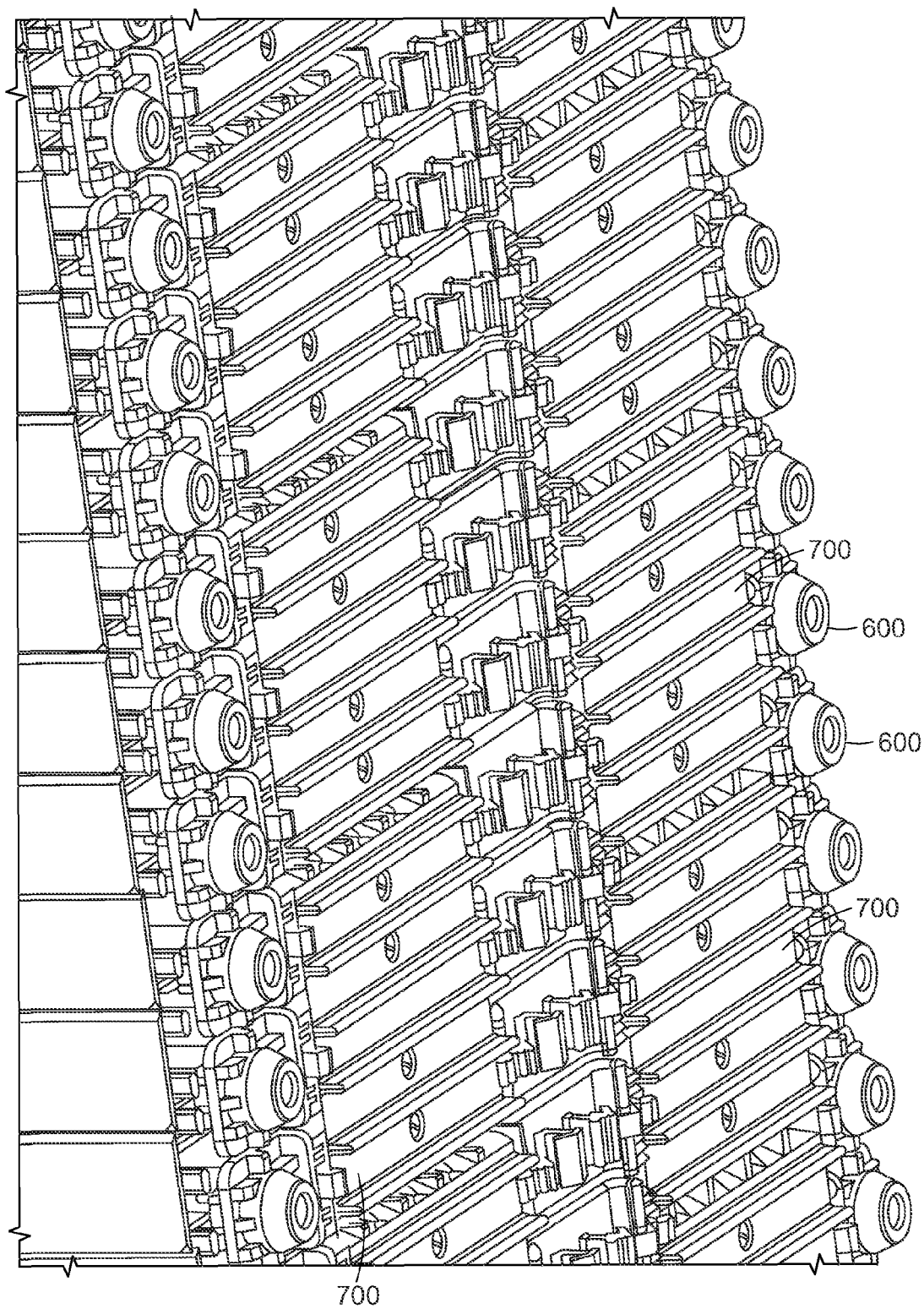
FIG. 14 shows several busbar supports attached to cell subassemblies in a battery module, each retaining at least a portion of a busbar jumper.

Busbar components consist of busbar jumpers, which electrically connect the module's adjacent cells, and busbar terminals, which electrically connect one or more battery cell terminals to each of the external terminals of the battery module. FIG. 14 shows a robust, compact, and cost-effective interconnection approach using these busbar components to enhance the module's life capability. This approach avoids using threaded fasteners for any of the electrical connections inside the module and to instead use precision welds that are produced with adaptive automatic computer-controlled processes.

FIG. 14 shows several busbar jumpers 700 each held by busbar supports 600. For each of the busbar supports through which a battery cell's terminal extends, the busbar jumper connected to that terminal is gripped between the support's fixed latch and its opposing flexible latch. The latches retain the busbar jumper against the terminal and prevent its movement.

Figure 15:
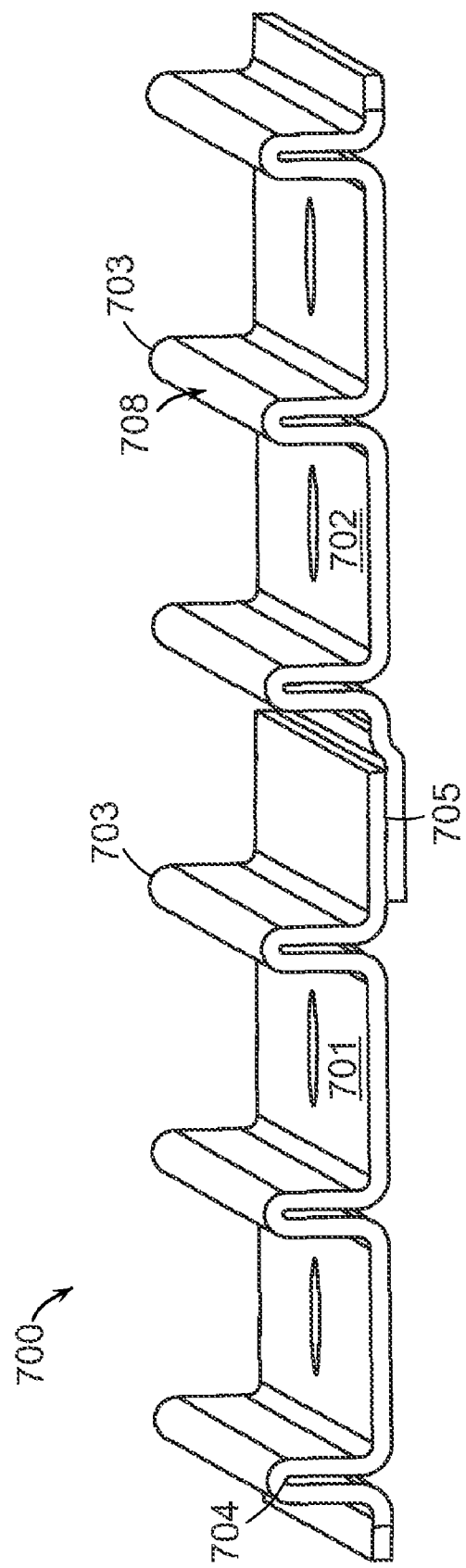
FIG. 15 shows a side profile of a busbar jumper.

FIG. 15 shows a bimetallic busbar jumper 700. The battery module uses a group of busbar jumpers 700, each including a copper portion 701 that is laser welded to a group of cell negative terminals which are made of a copper material, and an aluminum portion 702 that is laser welded to a group of cell positive terminals made of an aluminum material. The busbar jumper's 180-degree bends 703 define an inside surface 704 in which the cell terminals are nested during assembly. The portions of the busbar that have the bends are continuous pieces of metal. Precision laser welding is used to partially melt and metallurgically connect the busbar jumpers to the terminals in order to avoid ultrasonic welding that could inflict too much energy into a cell terminal and in turn damage a cell's internal electrical connections. A liquid welding treatment is applied to the outer surface (opposite inner surface 704) of the busbar jumper's bends 703. During welding, laser energy will be aimed at this surface. This treatment creates a finish that decreases the reflectivity of the laser beam during laser welding of the highly reflective surfaces of both aluminum and copper. This treatment may be a Nickel or Tin coating that provides for better absorption of the Nd-YAG laser beam wavelength. This allows one to minimize the energy required to weld and allows for the welding of cell terminals to be conducted without exceeding a maximum temperature limit of the cell terminal's seal. The laser beam's energy penetrates the busbar's 180-degree bend 703 and creates a molten bead inside the busbar's bend 704 and at the tip of the cell's terminal (not shown). The welding laser is aimed at the busbar's bend 703 at an angle substantially head-on to the end of the battery terminal and toward the outer surface of the bend as shown by angle of attack 708.

Figure 25:
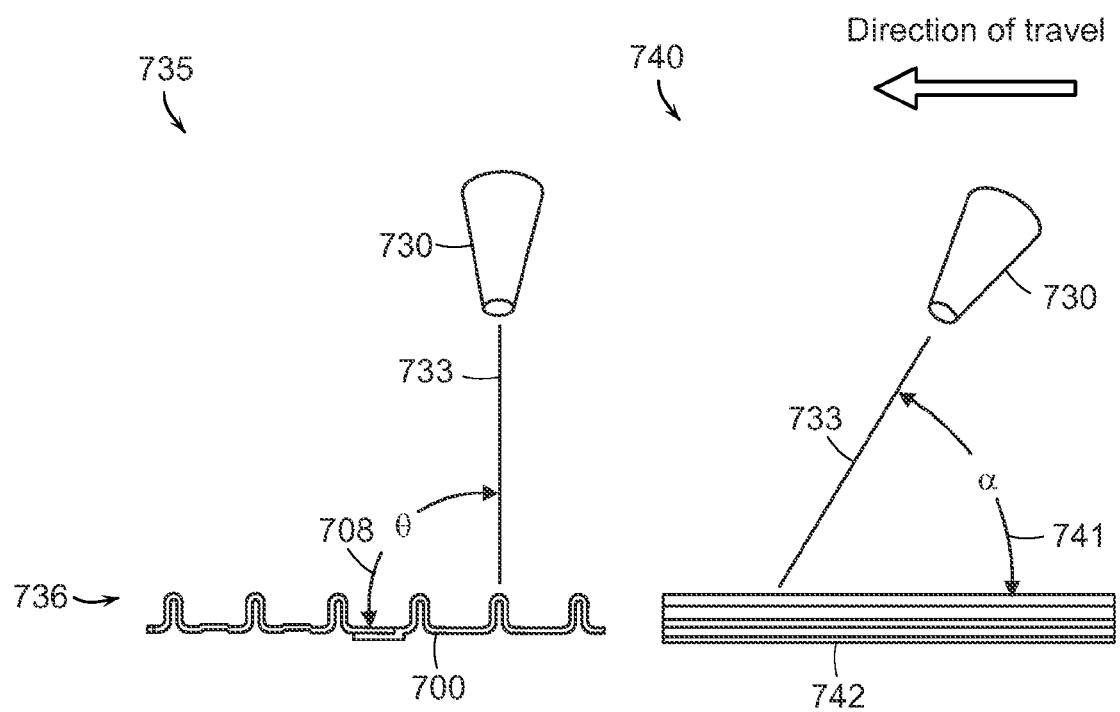
FIG. 25 shows views of a configuration of a welding laser with respect to a busbar component.

FIG. 25 shows an additional view 735 of the configuration of a welding laser 730 and a bimetallic busbar jumper 700, with the laser beam 733 directed at the busbar's bend at an angle of attack 708 that is substantially head-on to the end of the battery terminal. A second view 740 shows the configuration of view 735 as seen along line of reference 736 (i.e., view 735 rotated 90 degrees around the vertical z axis). View 740 shows laser 730 moving from the right side end of the busbar's bend 742 to the left, where the laser beam 733 moves in a direction of travel parallel to the channel, with the laser beam 733 directed at a slight angle 741 with respect the bend 742, with angle 741 opposing the direction of travel of the laser 730 to prevent the laser beam from backreflecting into the laser optics and causing damage. This results in laser beam 733 directed at an angle slightly less than perpendicular to the direction of travel of the laser beam. During welding, the laser 730 may move relative to the busbar and battery terminal being welded, the busbar and battery terminal assembly may move relative to the laser, or both may be moved relative to each other. The result in any case is that the busbar and battery terminal are attached to each other along the length of the channel in which the battery terminal resides.

Figure 26:
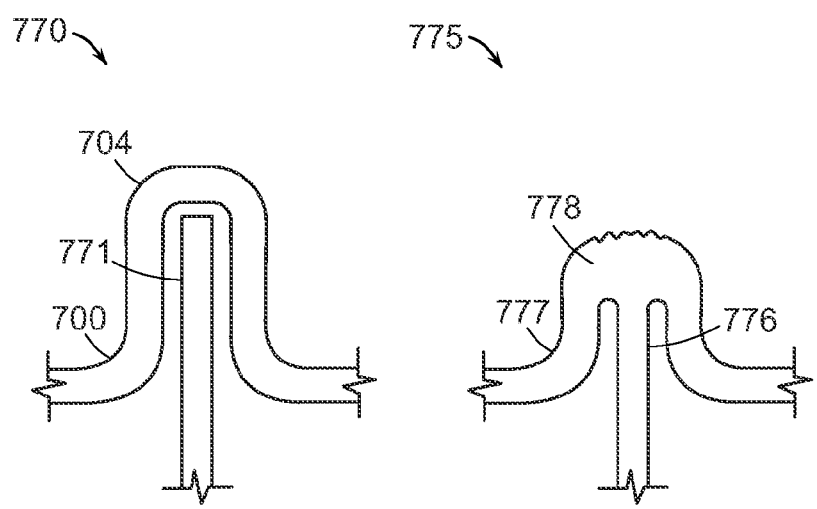
FIG. 26 shows before and after views of the attachment of a busbar component to a battery cell terminal.

FIG. 26 shows side views of the attachment of a busbar component to battery cell terminal both before and after attachment. View 770 shows a bend 704 in a busbar 700 forming a channel in which battery terminal 771 is positioned. View 775 shows these components after welding in which the battery terminal 776 is attached to an inside corner of a bend in a busbar 777 by a resolidified pool of metal 778.

Welding processes such as laser welding or other conventional welding processes may not be practical to use to join a bimetallic jumper busbar's two portions together due to the dissimilar materials and known metallurgical constraints. Instead, busbar jumper 700 employs an ultrasonic roller seam welding process to create a linear weld 705. The ultrasonic welding of the jumper busbar's two portions is performed separately from the module so that ultrasonic energy is not introduced into a cell terminal, in turn risking damage to a cell's internal electrical connections. As noted above, the busbar supports act as welding jigs. The busbar supports hold the busbar components in place with the cell terminals nested in the slots defined by the bends in the busbars until the busbars are laser welded to the terminals as discussed above.

To further balance and optimize the electrical current characteristics of the bimetallic jumpers, the cross-sections, widths and/or thicknesses of the jumper busbar's two portions—whose materials are aluminum and copper—may be independently tailored to achieve similar resistances through each portion. In manufacturing the busbar jumpers, extruded cut-to-length profiles for one or both of the bimetallic jumper busbar's two portions may be used instead of sheet stamping and forming processes in order to reduce cost. In one configuration, the copper portion of the busbar jumper is stamped and the aluminum portion is extruded.

FIG. 16 shows a busbar terminal 750 secured in part by busbar supports 600 and 650. Busbar supports retain the busbar terminals in the same manner as the supports retain the busbar jumpers. Busbar terminal 750 is laser welded to a corresponding terminal of battery cells 300a, 310a, and 320. Battery modules use a monometallic negative busbar terminal with a copper material at one end of the module's main stack and a monometallic positive busbar terminal with an aluminum material at the other end of the module's main stack. The busbar terminals are secured by steel busbar nuts 760 that are attached to the sockets 508 of the pressure plate 50. The busbar terminal 750 has a tapered central portion 751 that acts as a module fuse if a worst-case electrical overload incident occurs. The fuse will have a tendency to melt at the narrow portion where the current density if the highest. The module's safety capability may be improved by adjusting the actuation response time of the two module fuses by adding zipper fuse holes and slots to the busbar terminals in a similar manner to the way zipper fuses are integrated into the battery cell terminals.

Figure 17:
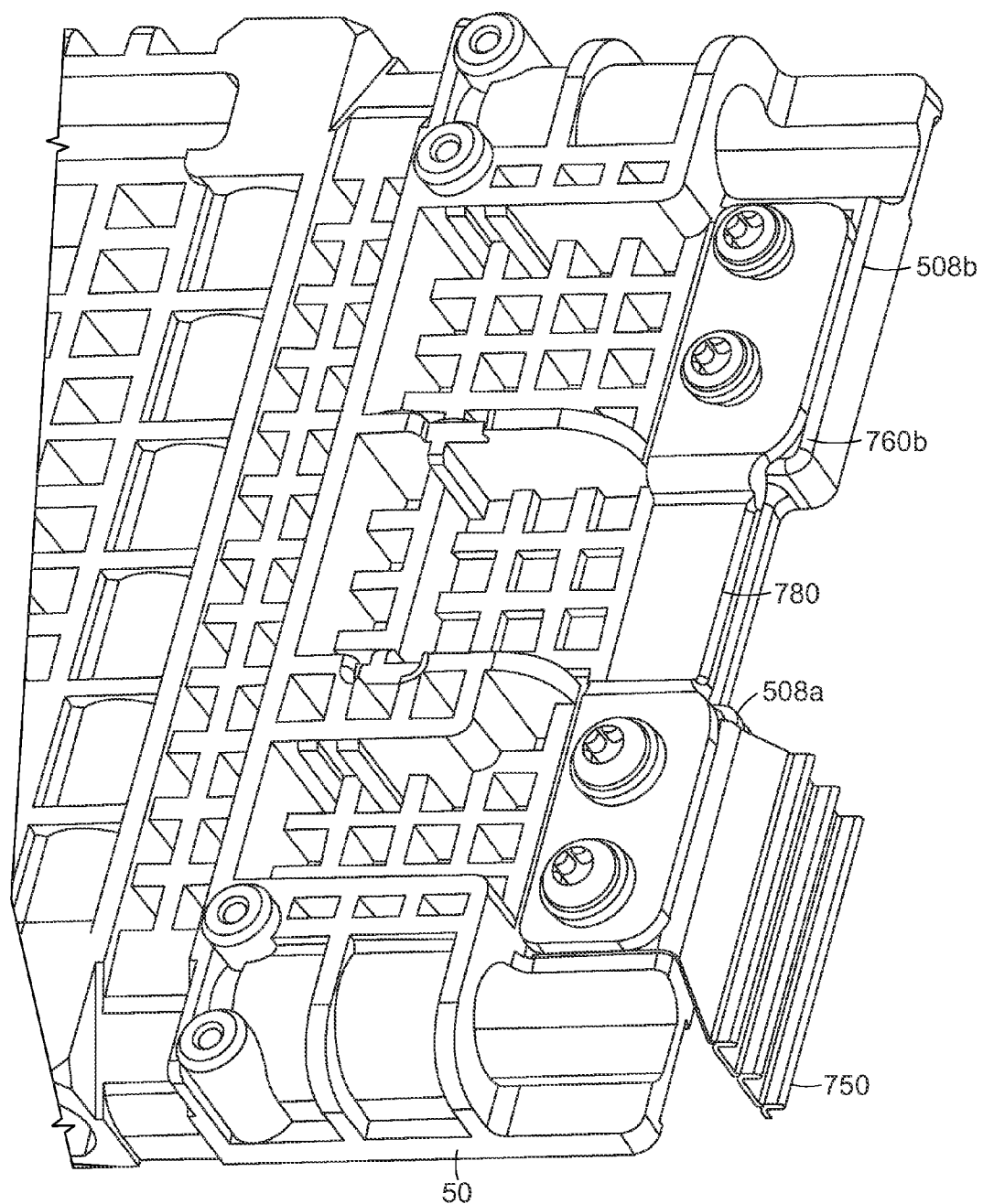
FIG. 17 shows a busbar terminal attached to a pressure plate and a busbar bridge.

FIG. 17 shows the installation of busbar terminal 750 to pressure plate 50. Busbar terminal 750 is attached to a steel busbar nut (not visible under busbar terminal in FIG. 17). The busbar nut is attached to one of the pressure plate's sockets 508a. Busbar terminal 750 is connected to an external power lug and wiring harness (not shown) as described earlier. In addition, a stamped copper busbar nut bridge 780 may be connected to busbar terminal 750 and also connected to pressure plate socket 508b through busbar nut 760b. Busbar nut 760b is secured to pressure plate 50 through a center hole that grips a steel fastener disposed in pressure plate socket 508b. The bridge is an accessory that permits an optional attachment site for the module-to-module high-power wiring harness.

Wiring Attachments

Figure 18:
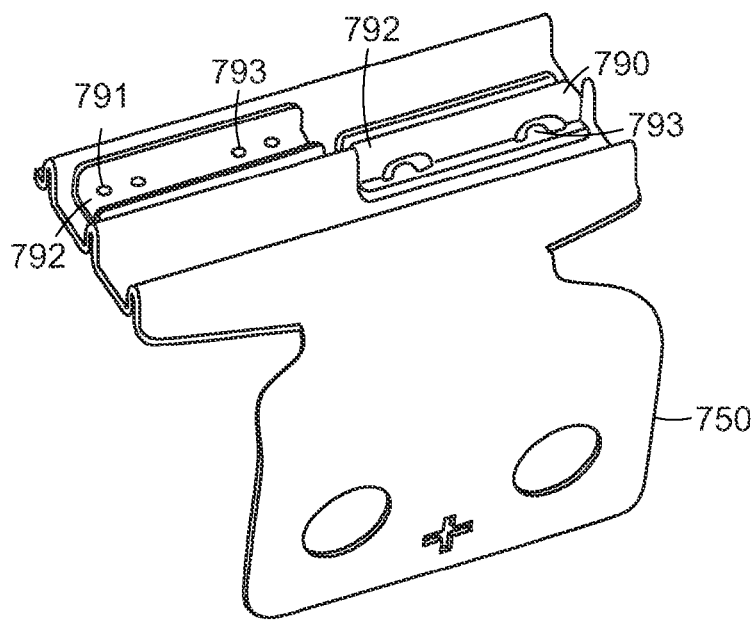
FIG. 18 shows a busbar terminal with two variations of clips for attachment of wiring.

FIG. 18 shows a busbar terminal 750 with two variations of clips used to attach wiring, such as voltage sense wiring harnesses, to busbar terminals and busbar jumpers. From one side, clip 791 is u-shaped and substantially convex, while clip 790 is w-shaped. Either or both of clips 790 and 791 may be used to connect wiring. Voltage sense wires are ultrasonically welded to the clips prior to attaching the clips to the busbar components. The clips have one or more teeth 793 that bite into the busbar jumpers or terminals so that the clips can be positioned and retained in place until a laser welding operation fastens the clips to the busbar. The clips may be of stamped copper or aluminum corresponding to and compatible with the type of busbar to which they will be attached. Clips have notching 792 for one metal type to indicate the type of clip for manufacturing using automatic vision systems. These clips are laser welded to the busbar components at the same time the busbar components are welded to the battery cell terminals and share a common weld. Using the same welding technique described above for attaching busbar components to battery terminals, a laser is directed through the clip and the underlying busbar component and pointed at the end of the terminal that rests in the u-shaped bend of the busbar component. In so doing, a single welding operation welds all three components (the clip, the busbar component, and the battery terminal) at the same time. The u-shaped clips may also be laser welded to the busbar component without sharing a common weld.

Figure 19:
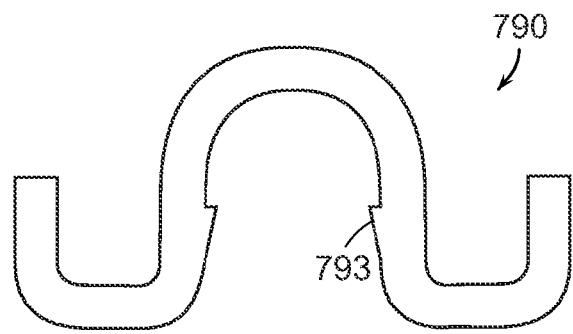
FIG. 19 shows a side view of a wiring attachment clip.

FIG. 19 shows a side-view of w-shaped clip 790 with the clip's teeth 793 bent slightly inward for installation on a busbar. Teeth may or may not be required to secure the clip to the busbar until it is welded if the clip is designed with an interference fit such that the interference would provide the retaining function.

Figure 20:
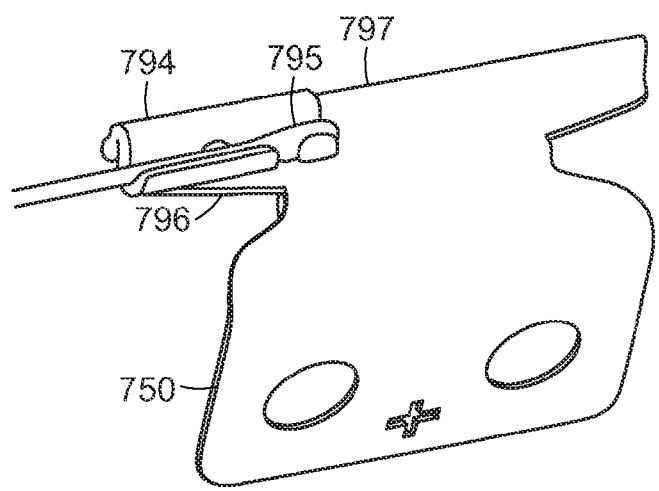
FIG. 20 shows a support clip for attachment of a thermistor.

FIG. 20 shows a busbar terminal 750 with a clip 794 for attaching a thermistor 795 to the busbar terminal. The thermistor's head is bonded inside the clip's retainer with a dispensed cure-after-assembly epoxy adhesive. The neck of the thermistor's head contacts the adjacent tab 796 so that the head has a defined repeatable location. Coined chamfers 797 to the retainer's upper edges help prevent damage to the thermistor's head when it is installed.

Busbar Covers

FIG. 1 shows three busbar covers 40. Battery modules use a group of molded plastic covers to protect the module's busbars and other internal components, such as the voltage sense wiring harness and thermistor wiring harness, from any accidental contact by external foreign objects, especially if they are metallic.

Figure 21:
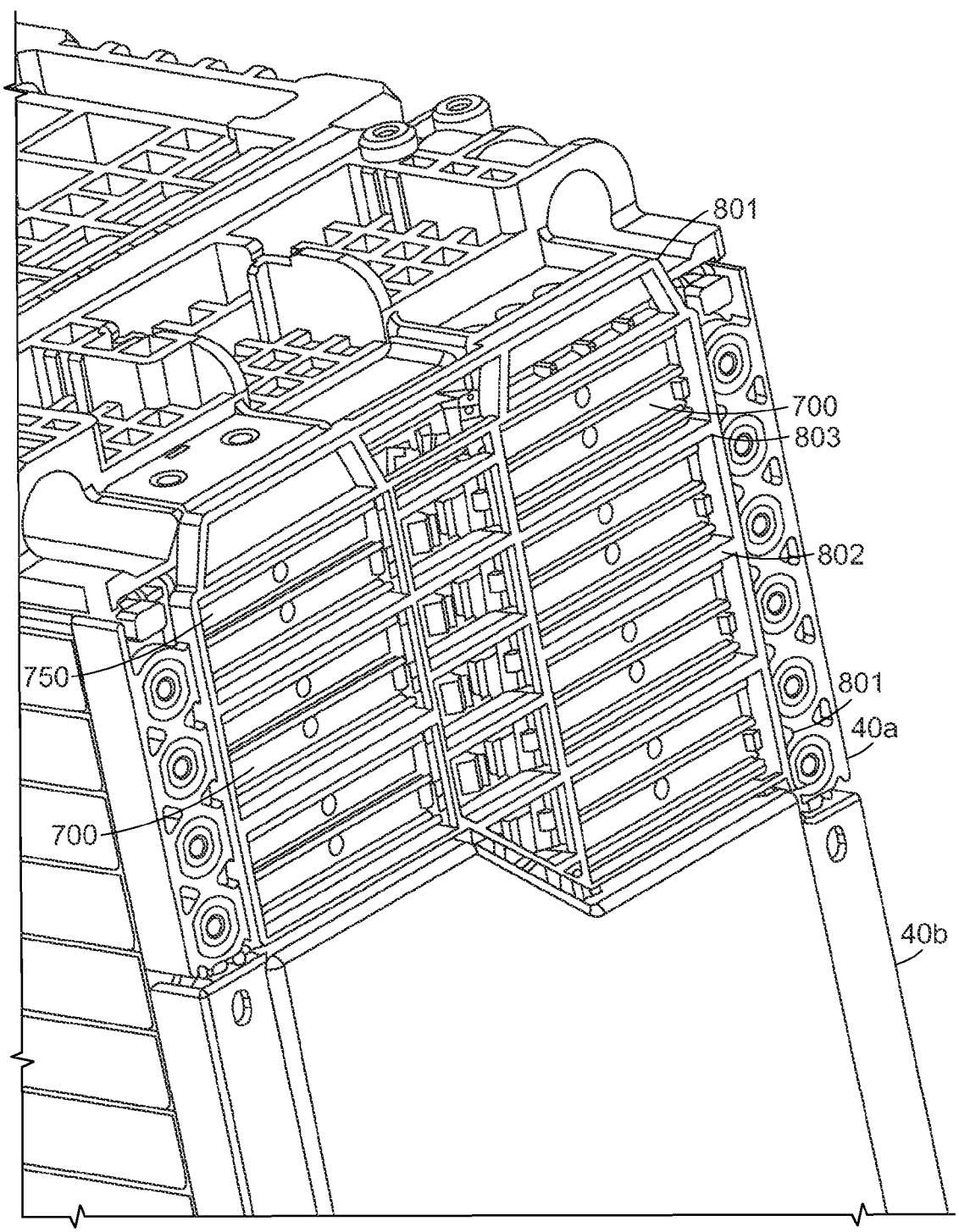
FIG. 21 shows a cutaway view of a busbar cover.

FIG. 21 shows a busbar cover 40a without the cover's main flat skin so that the relative fits may be witnessed. Busbar cover 40b is also shown, including the cover's main flat skin. Each of the covers has a matrix of reinforcing ribs, including 801, 802 and 803, to enhance its structural rigidity and to also redirect and distribute any adverse external forces to the module's busbar supports and heatsinks instead of the busbar terminals 750, busbar jumpers 700 and/or cell terminals. Busbar covers envelop the module's busbars to help prevent adjacent busbars from contacting each other and causing electrical short circuit paths during a worst-case electrical overload incident or severe vehicle crash. Certain ribs, e.g., rib 802, extend deeper into the battery module than other ribs and in between the busbar jumpers, e.g., 803, to help prevent contact between adjacent busbars, while ribs such as 803 are less deep to avoid distributing forces to the busbar terminals, busbar jumpers or cell terminals. Alternatively, the battery module may use lower-cost, simpler covers which have an overlap joint and fewer vertical contact tabs. The disadvantage with this latter approach is that the module's robustness to withstand vertical external forces may be diminished.

Scalable Architecture

Figure 22:
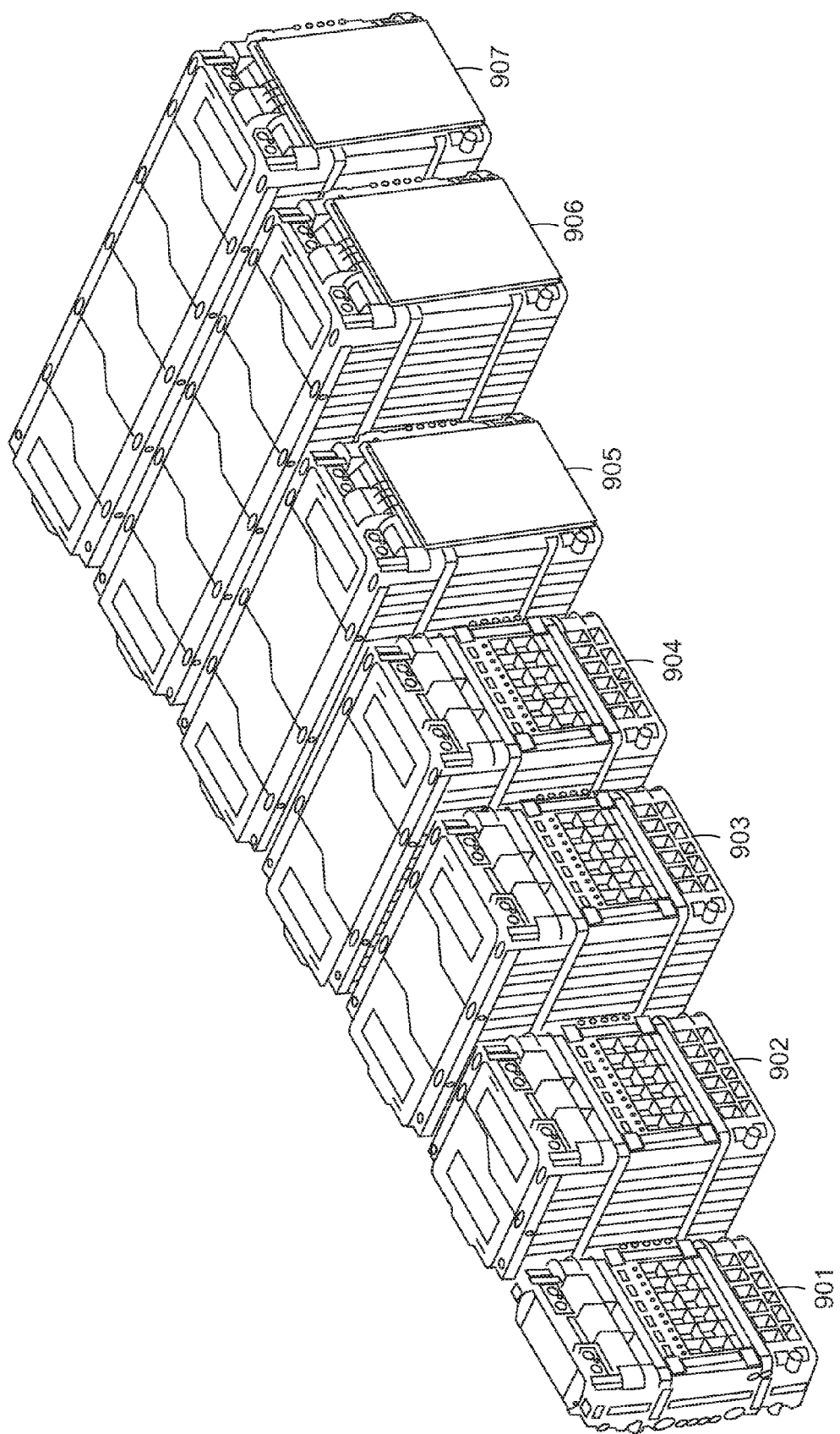
FIG. 22 shows a family of battery modules incorporating a scalable architecture.

The above described features yield a scalable architecture. The term 'scalable architecture' refers to a flexible configuration which facilitates the rapid engineering, development, qualification, and production of battery modules that have different quantities of battery cells, subgroups with cells that are electrically connected in parallel, and subgroups that are electrically connected in series. This flexibility enables a battery supplier to tailor the electrical characteristics of many different modules and to satisfy diverse customer performance specifications. For example, the present A123Systems prismatic battery module family with the '3P' configuration is shown in FIG. 22. The seven members of this family are the 23S3P, 22S3P, 16S3P, 13S3P, 11S3P, 6S3P, and 1S3P modules, identified respectively in FIG. 22 as 907, 906, 905, 904, 903, 902, and 901.

FIG. 24 shows various busbar component configurations for the following members of the A123Systems prismatic battery module family, 13S3P, 23S2P, 4S2P, and 4S6P identified respectively in FIG. 23 as 950, 951, 952, and 953.

What is claimed is:

1. A battery system comprising:
   a plurality of subunits each of which comprises a heatsink and a battery cell having a top end and first and second voltage terminals both of which extend out of the top end of the battery cell, said first and second terminals of each battery cell being symmetrically positioned with respect to a centerline of that battery cell, wherein all of the battery cells among the plurality of subunits are arranged so that their first voltage terminals are aligned along a first row and their second voltage terminals are aligned along a second row;
   a plurality of identical busbar supports equal in number to the plurality of subunits, each busbar support among the plurality of busbar supports having two slots and being mounted on a corresponding different one of the subunits with each of the first and second terminals of the battery cell for that subunit extending up through a corresponding different one of the two slots; and
   a plurality of bimetallic busbars, each one supported by a different corresponding subset of the busbar supports and electrically connected directly to either a first or second terminal of each of the battery cells of each of the modules on which those busbar supports are mounted,
   wherein the battery cells are prismatic battery cells, both the first row and the second rows are situated on the same side of the battery system, and all but one of the heatsinks are identical to each other.

2. The battery system of claim 1, wherein each of the plurality of subunits are identical to one another except for the orientation of each of the battery cells of the subunits with respect to the battery cell's centerline.

3. The battery system of claim 1, wherein each of the plurality of busbars electrically connects at least two adjacent terminals of the same row.

4. The battery system of claim 1, further comprising a first pressure plate and a second pressure plate wherein the plurality of subunits is arranged as a stack of subunits and wherein the stack of subunits is located between the first pressure plate and the second pressure plate.

5. The battery system of claim 4, wherein one or more compliant pads are located between the first pressure plate and the neighboring subunit.

6. The battery system of claim 4, further comprising a band wherein the band encircles the first and second pressure plates and the plurality of subunits.

7. A battery system comprising:
   a plurality of subunits each of which comprises a heatsink and a battery cell having a top end and first and second voltage terminals both of which extend out of the top end of the battery cell, said first and second terminals of each battery cell being symmetrically positioned with respect to a centerline of that battery cell, wherein all of the battery cells among the plurality of subunits are arranged so that their first voltage terminals are aligned along a first row and their second voltage terminals are aligned along a second row;
   a plurality of identical busbar supports equal in number to the plurality of subunits, each busbar support among the plurality of busbar supports having two slots and being mounted on a corresponding different one of the subunits with each of the first and second terminals of the battery cell for that subunit extending up through a corresponding different one of the two slots; and
   a plurality of bimetallic busbars, each one supported by a different corresponding subset of the busbar supports and electrically connected directly to either a first or second terminal of each of the battery cells of each of the modules on which those busbar supports are mounted,
   wherein the battery cells are prismatic battery cells, both the first row and the second rows are situated on the same side of the battery system, and all but two of the heatsinks are identical to each other.

8. The battery system of claim 7, wherein each of the plurality of subunits further comprises a second battery cell having a top end and first and second voltage terminals both of which extend out of the top end of the second battery cell, said first and second terminals of each second battery cell being symmetrically positioned with respect to a centerline of that battery cell wherein each of the second battery cells among the plurality of subunits are arranged so that their first voltage terminals are aligned along the first row and their second voltage terminals are aligned along the second row.

9. The battery system of claim 7, wherein each of the plurality of subunits are identical to one another except for the orientation of each of the battery cells of the subunits with respect to the battery cell's centerline.

10. The battery system of claim 7, wherein each of the plurality of busbars electrically connects at least two adjacent terminals of the same row.

11. The battery system of claim 7, further comprising a first pressure plate and a second pressure plate wherein the plurality of subunits is arranged as a stack of subunits and wherein the stack of subunits is located between the first pressure plate and the second pressure plate.

12. The battery system of claim 11, wherein one or more compliant pads are located between the first pressure plate and the neighboring subunit.

13. The battery system of claim 11, further comprising a band wherein the band encircles the first and second pressure plates and the plurality of subunits.

14. The battery system of claim 7, wherein each of the plurality of subunits further comprises a second battery cell having a top end and first and second voltage terminals both of which extend out of the top end of the second battery cell, said first and second terminals of each second battery cell being symmetrically positioned with respect to a centerline of that battery cell wherein each of the second battery cells among the plurality of subunits are arranged so that their first voltage terminals are aligned along the first row and their second voltage terminals are aligned along the second row.

* * * * *